United States Patent
Matsumoto et al.

(10) Patent No.: US 10,077,335 B2
(45) Date of Patent: Sep. 18, 2018

(54) FIBER REINFORCED POLYAMIDE RESIN MATERIAL

(71) Applicant: Mitsubishi Gas Chemical Company, Inc., Tokyo (JP)

(72) Inventors: Nobuhiko Matsumoto, Kanagawa (JP); Jun Mitadera, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/429,486

(22) PCT Filed: Aug. 1, 2013

(86) PCT No.: PCT/JP2013/070861
§ 371 (c)(1),
(2) Date: Mar. 19, 2015

(87) PCT Pub. No.: WO2014/050303
PCT Pub. Date: Apr. 3, 2014

(65) Prior Publication Data
US 2015/0322206 A1 Nov. 12, 2015

(30) Foreign Application Priority Data

Sep. 25, 2012 (JP) ................................. 2012-210780

(51) Int. Cl.
| | | |
|---|---|---|
| C08G 69/26 | (2006.01) | |
| C08G 69/48 | (2006.01) | |
| C08J 5/06 | (2006.01) | |
| C08K 9/04 | (2006.01) | |
| C08L 77/06 | (2006.01) | |
| C08K 7/06 | (2006.01) | |
| C08J 3/24 | (2006.01) | |

(52) U.S. Cl.
CPC ............. *C08G 69/48* (2013.01); *C08J 3/242* (2013.01); *C08J 5/06* (2013.01); *C08K 7/06* (2013.01); *C08K 9/04* (2013.01); *C08L 77/06* (2013.01); *C08J 2377/06* (2013.01)

(58) Field of Classification Search
CPC ........... C08J 5/06; C08J 2377/06; C08L 77/00
See application file for complete search history.

(56) References Cited

U.S. PATENT DOCUMENTS

| 6,518,341 B1 * | 2/2003 | Hurley ..................... C08K 3/16 524/258 |
| 2004/0191511 A1 * | 9/2004 | Sugiura ................... D06M 7/00 428/357 |
| 2005/0250886 A1 * | 11/2005 | Stoeppelmann ..... C08K 5/0091 524/99 |
| 2010/0120972 A1 * | 5/2010 | Yuan ....................... C08L 77/06 524/546 |
| 2013/0062806 A1 | 3/2013 | Mitadera |
| 2013/0066041 A1 | 3/2013 | Mitadera et al. |

FOREIGN PATENT DOCUMENTS

| CA | 2 781 741 A1 | 9/2012 |
| JP | 2008-025638 A | 2/2008 |
| JP | 2011-102360 A | 5/2011 |
| JP | 4894982 B1 | 3/2012 |
| JP | 2012-229345 A | 11/2012 |
| RU | 2152411 C1 | 7/2000 |
| WO | 2012/014772 A1 | 2/2012 |

OTHER PUBLICATIONS

International Search Report dated Sep. 24, 2013 for PCT/JP2013/070861 and English translation of the same (4 pages).
European Patent Office Extended European Search Report dated May 23, 2016 for European Application No. 13842152.4 (9 pages).
Russian Federation Industrial Property Office, Office Action dated May 30, 2017 in counterpart Russian Patent Application No. 2015115531 (7 pages).

* cited by examiner

*Primary Examiner* — Gregory Listvoyb
(74) *Attorney, Agent, or Firm* — Fitch, Even, Tabin & Flannery LLP

(57) ABSTRACT

Provided is a fiber reinforced polyamide resin material which has high rigidity and low water absorbency, and is excellent in moldability and mechanical properties of the molded article. A fiber reinforced polyamide resin material, comprises 100 parts by mass of polyamide resin (A) which is a polycondensate of diamine and dicarboxylic acid and 5 to 300 parts by mass of a carbon fiber (B); wherein 70 mol % or more of the diamine is a xylylenediamine; 50 mol % or more the dicarboxylic acid is a Straight-chain aliphatic dicarboxylic acid containing 4 to 20 carbon atoms; the polyamide resin (A) has a terminal amino group concentration ($[NH_2]$) (in $\mu eq/g$) of $5 < [NH_2] < 150$; and the carbon fiber (B) has on a surface thereof a compound (C) which is reactive with amino group.

23 Claims, No Drawings

FIBER REINFORCED POLYAMIDE RESIN MATERIAL

CROSS-REFERENCE TO RELATED APPLICATIONS

This application is a U.S. national phase application filed under 35 U.S.C. § 371 of International Application PCT/JP2013/070861, filed on Aug. 1, 2013, designating the United States, which claims priority from Japanese Application Number 2012-210780, filed Sep. 25, 2012, which are hereby incorporated herein by reference in their entirety.

TECHNICAL FIELD

The present invention relates to a fiber reinforced polyamide resin material, and particularly relates to a fiber reinforced polyamide resin material which has high rigidity and low water absorbency, and is excellent in moldability and mechanical properties of the molded article.

BACKGROUND ART

Polyamide resin has been known as an engineering plastic excellent in high mechanical strength such as impact resistance, abrasion resistance and wear resistance, and also excellent in heat resistance and oil resistance; and polyamide resin has been used widely in fields of automobile parts, parts for electric/electronic apparatuses, parts for OA apparatuses, machinery parts, and parts for building/housing equipment.

Fiber reinforced resin material using thermoplastic resin such as polyamide resin, polypropylene or the like, as a matrix resin compounded with glass fiber or the like is characterized by its light weight and high rigidity, and therefore, molded articles using the fiber reinforced resin material have been used widely for mechanical parts, parts for electric/electronic apparatuses, vehicle parts or members and so forth.

Patent literature 1 by the present applicant has disclosed that a fiber reinforced polyamide resin composition configured by a polyamide resin, which uses meta-xylylenediamine as a diamine component and is reinforced by a fiber material, and the fiber reinforced polyamide resin composition is excellent in terms of physical properties under high temperature and high humidity, low warpage, dimensional stability, heat resistance, lightness of weight, adaptability for recycling, moldability, and productivity. However, there has been an additional need for improving fracture strength through enhanced interface adhesiveness.

CITATION LIST

Patent Literature

[Patent literature 1] JP-A-2011-102360

SUMMARY OF THE INVENTION

Technical Problem

It is therefore an object of the present invention to solve the problems described above, and to provide a fiber reinforced polyamide resin material which has high rigidity and low water absorbency, and is excellent in moldability and mechanical properties of the molded article.

Solution to Problem

After intensive studies for achieving the object described above, the present inventors found out that a highly functional polyamide resin-based fiber reinforced polyamide resin material, successfully freed from the problems, is obtainable when the fiber reinforced polyamide resin material is improved in the interface adhesiveness, that is, an interfacial shear strength between the polyamide resin and the carbon fiber, by combining a resin in which 70 mol % or more of a diamine constitutive unit is derived from a xylylenediamine and 50 mol % or more of a dicarboxylic acid constitutive unit is derived from a Straight-chain aliphatic dicarboxylic acid containing 4 to 20 carbon atoms, and the resin having a high terminal amino group concentration, with a carbon fiber having on a surface thereof a compound having a functional group reactive with amino group. The finding led us to complete the present invention.

The present invention provides a fiber reinforced polyamide resin material, and a molded article using the fiber reinforced polyamide resin material, as described below.

<1> A fiber reinforced polyamide resin material, comprising 100 parts by mass of polyamide resin (A) which is a polycondensate of diamine and dicarboxylic acid and 5 to 300 parts by mass of a carbon fiber (B); wherein 70 mol % or more of the diamine is a xylylenediamine; 50 mol % or more of the dicarboxylic acid is a Straight-chain aliphatic dicarboxylic acid containing 4 to 20 carbon atoms; the polyamide resin (A) has a terminal amino group concentration ($[NH_2]$) (in µeq/g) of $5<[NH_2]<150$; and the carbon fiber (B) has on a surface thereof a compound (C) which is reactive with amino group.

<2> The fiber reinforced polyamide resin material of <1>, wherein the polyamide resin (A) has a terminal carboxy group concentration ($[COOH]$) (in µeq/g) of $5<[COOH]<80$.

<3> The fiber reinforced polyamide resin material of <1> or <2>, wherein the polyamide resin (A) has a terminal amino group concentration ($[NH_2]$) (in µeq/g)/terminal carboxy group concentration ($[COOH]$) (in µeq/g) of $[NH_2]/[COOH] \geq 1.00$.

<4> The fiber reinforced polyamide resin material of any one of <1> to <3>, wherein the terminal amino group concentration ($[NH_2]$) (in µeq/g) of the polyamide resin (A) falls in the range of $50<[NH_2]<150$ (in µeq/g).

<5> The fiber reinforced polyamide resin material of <1>, wherein the terminal amino group concentration ($[NH_2]$) of the polyamide resin (A) is $70<[NH_2]<150$ (in µeq/g); the polyamide resin (A) has a terminal carboxy group concentration ($[COOH]$) of $20<[COOH]<50$ (in µeq/g); and the polyamide resin (A) satisfies $[NH_2]/[COOH] \geq 1.40$.

<6> The fiber reinforced polyamide resin material of any one of <1> to <5>, wherein the xylylenediamine is meta-xylylenediamine, para-xylylenediamine or a mixture of meta-xylylenediamine and para-xylylenediamine.

<7> The fiber reinforced polyamide resin material of any one of <1> to <6>, wherein the straight-chain aliphatic dicarboxylic acid is adipic acid, sebacic acid or a mixture of adipic acid and sebacic acid.

<8> The fiber reinforced polyamide resin material of any one of <1> to <7>, wherein the polyamide resin (A) comprises 50 mol % or more of a dicarboxylic acid constitutive unit derived from sebacic acid.

<9> The fiber reinforced polyamide resin material of any one of <1> to <8>, wherein 80 mol % or more of a diamine constitutive unit is derived from xylylenediamine and 30 mol % or more of a diamine constitutive unit is derived from para-xylylenediamine.

<10> The fiber reinforced polyamide resin material of any one of <1> to <9>, wherein the polyamide resin (A) has a concentration of a reactive functional group of 40 µeq/g or more; and the compound (C) which is reactive with amino group is treated in an amount of 1.5% by mass or less of the carbon fiber (B).

<11> The fiber reinforced polyamide resin material of <10>, wherein the reactive functional group is carboxy group and amino group.

<12> The fiber reinforced polyamide resin material of any one of <1> to <11>, wherein the compound (C) which is reactive with amino group is at least one species selected from the group consisting of epoxy compound, acrylic compound, silane compound, titanate compound, alkylene glycol compound, carboxylic acid compound, hydroxylated compound, isocyanate compound, aldehyde compound, unsaturated fatty acid and saturated fatty acid.

<13> The fiber reinforced polyamide resin material of any one of <1> to <11>, wherein the compound (C) which is reactive with amino group is at least one species selected from the group consisting of epoxy compound, isocyanate compound, aldehyde compound, unsaturated fatty acid and saturated fatty acid.

<14> The fiber reinforced polyamide resin material of any one of <1> to <11>, wherein the compound (C) which is reactive with amino group is at least one species selected from the group consisting of bisphenol A-glycidyl ether, bisphenol F-glycidyl ether and tolylene diisocyanate.

<15> The fiber reinforced polyamide resin material of any one of <1> to <11>, wherein the compound (C) which is reactive with amino group is at least one species selected from the group consisting of a dicyanate adduct of bisphenol A and an alkylene oxide adduct diglycidyl ether of bisphenol F.

<16> The fiber reinforced polyamide resin material of any one of <1> to <15>, wherein the polyamide resin (A) has a relative viscosity of 1.3 to 3.3.

<17> The fiber reinforced polyamide resin material of any one of <1> to <16>, which satisfies a interfacial shear strength between the polyamide resin (A) and the carbon fiber (B), measured by the micro-droplet method, of 40 MPa or larger.

<18> The fiber reinforced polyamide resin material of any one of <1> to <17>, wherein the polyamide resin (A) has a number-average molecular weight of 50,000 or smaller.

<19> The fiber reinforced polyamide resin material of any one of <1> to <18>, having at least one bond formed between the compound (C) which is reactive with amino group and amino group(s) contained in the polyamide resin (A).

<20> A material obtained by kneading a fiber reinforced polyamide resin material described in any one of <1> to <19>.

<21> A molded article obtained by molding a fiber reinforced polyamide resin material described in any one of <1> to <19> or a material described in <20>.

<22> A method for manufacturing a molded article, the method comprising pressing a fiber reinforced polyamide resin material described in any one of <1> to <19>, or a material described in <20>, for 1 to 60 minutes.

<23> Cloth or tape comprising a fiber reinforced polyamide resin material described in <1> to <19>.

Advantageous Effects of Invention

The fiber reinforced polyamide resin material of the present invention, configured by a specific polyamide resin obtained from xylylenediamine and a specific aliphatic dicarboxylic acid, being reinforced with carbon fiber, is excellent in terms of high rigidity, low water absorbency, and moldability.

The molded article molded from the fiber reinforced polyamide resin material of the present invention has various excellent mechanical properties, and is capable of reducing product weight, and is preferably used for parts or enclosures of electric/electronic apparatuses, various automobile parts or members, and various structural members.

DESCRIPTION OF EMBODIMENTS

The fiber reinforced polyamide resin material of the present invention includes 100 parts by mass of polyamide resin (A) which is a polycondensate of diamine and dicarboxylic acid; and 5 to 300 parts by mass carbon fiber (B), wherein 70 mol % or more of the diamine being xylylenediamine, 50 mol % or more of the dicarboxylic acid being Straight-chain aliphatic dicarboxylic acid containing 4 to 20 carbon atoms, terminal amino group concentration ([$NH_2$]) of the polyamide resin (A) falling in a range of 5<[$NH_2$]<150 (in µeq/g), and, the carbon fiber (B) having on the surface thereof a compound (C) which is reactive with amino group.

The present invention will be detailed below. Note that, while the description on constituent features given below may occasionally be based on representative embodiments of the present invention, the present invention is by no means limited to such embodiments. In this specification, all numerical ranges expressed using "to" with preceding and succeeding numerals are defined to contain these numerals as the lower and upper limit values.

[Polyamide Resin (A)]

The polyamide resin (A) used in the present invention is a polycondensate of diamine and dicarboxylic acid, and is a polyamide resin in which 70 mol % or more of the diamine constitutive unit (constitutive unit derived from diamine) is derived from xylylenediamine, 50 mol % or more of the dicarboxylic acid constitutive unit (constitutive unit derived from dicarboxylic acid) is derived from Straight-chain aliphatic dicarboxylic acid containing 4 to 20 carbon atoms, and terminal amino group concentration ([$NH_2$]) falls in the range of 5<[$NH_2$]<150 (eq/g).

The diamine constitutive unit of the polyamide resin (A) derived from xylylenediamine preferably amounts 80 mol % or more, more preferably amounts 85 mol % or more, and furthermore preferably amounts 90 mol % or more.

Xylylenediamine is preferably meta-xylylenediamine or para-xylylenediamine, which may be used independently or in a mixed manner. When used in the mixed manner, meta-xylylenediamine and para-xylylenediamine may be mixed in an arbitrary ratio. If heat resistance is of great significance, 0 to 50 mol % of meta-xylylenediamine and 50 to 100 mol % of para-xylenediamine are preferably used, and meanwhile if moldability of the resultant fiber reinforced polyamide resin material is of great significance, 50 to 100 mol % of meta-xylylenediamine and 0 to 50 mol % of para-xylenediamine are preferably used.

In the present invention, in particular for the case where short-time press molding takes place as described later, it is preferable that 80 mol % or more of a diamine constitutive unit is derived from xylylenediamine, and 30 mol % or more of a diamine constitutive unit is derived from para-xylylenediamine; it is more preferable that 90 mol % or more of a diamine constitutive unit is derived from xylylenediamine, and 40 mol % of a diamine constitutive unit is derived from para-xylylenediamine; it is furthermore preferable that 90 mol % or more of a diamine constitutive unit is derived from xylylenediamine, and 50 mol % or more of a diamine constitutive unit is derived from para-xylylenediamine; and it is particularly preferable that 90 mol % or more of a diamine constitutive unit is derived from xylylenediamine, and 70 mol % or more of a diamine constitutive unit is derived from para-xylylenediamine. With this sort of polyamide resin (A), the resin may now be improved in the rate of semi-crystallization, and thereby interfacial shear strength between the polyamide resin (A) and the carbon fiber (B) may further be improved. By using this construction, the polyamide resin (A) can more quickly impregnate into the carbon fiber (B), and can thereby obtain a resin molded article with high strength within a shorter time of molding. Moreover, better impregnation of the polyamide resin (A) into the carbon fiber (B) tends to reduce voids in the molded article, and makes the properties of the molded article less likely to degrade under water.

Examples of diamine usable as source diamine for the polyamide resin (A), other than meta-xylylenediamine and para-xylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylene diamine, and 2,4,4-trimethylhexamethylene diamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring such as bis(4-aminophenyl)ether, paraphenylenediamine, and bis(aminomethyl)naphthalene, all of which may be used independently, or two or more species may be used in a mixed manner.

When diamine other than xylylenediamine is used as the source diamine, the content is preferably 30 mol % or less of a diamine constitutive unit, more preferably 25 mol % or less, and furthermore preferably 20 mol % or less.

As for the dicarboxylic acid constitutive unit, preferably 80 mol % or more thereof, more preferably 85 mol % or more thereof, and furthermore preferably 90 mol % or more thereof is derived from Straight-chain aliphatic dicarboxylic acid containing 4 to 20 carbon atoms.

The source dicarboxylic acid of the polyamide resin (A) contains the Straight-chain aliphatic dicarboxylic acid containing 4 to 20 carbon atoms as a major ingredient, wherein the preferable examples of the dicarboxylic acid include aliphatic dicarboxylic acids such as succinic acid, glutaric acid, pimelic acid, suberic acid, azelaic acid, adipic acid, sebacic acid, undecanedioic acid, and dodecanedioic acid, which may be used independently, or two or more species may be used in a mixed manner. Among them, from the viewpoint that the melting point of the polyamide resin can fall in a range appropriate for the molding process, sebacic acid, adipic acid or mixtures of sebacic acid and adipic acid are preferable, and sebacic acid is more preferable. The sebacic acid is preferably derived from natural materials, and is particularly preferable if it is extracted from castor bean. By using such sebacic acid, the ratio of content of plant-derived ingredient, that is, "botanical degree", in the resultant fiber reinforced polyamide resin material may be elevated.

Also aromatic dicarboxylic acid may be used as the dicarboxylic acid component other than Straight-chain aliphatic dicarboxylic acid containing 4 to 20 carbon atoms, and example of which include phthalic acid compounds such as isophthalic acid, terephthalic acid, and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, all of which may be used independently, or two or more species may be used in a mixed manner.

Among them, from the viewpoint of moldability and barrier performance, it is preferable to use isophthalic acid, wherein the content of isophthalic acid-derived component in the dicarboxylic acid constitutive unit is 50 mol % or less, more preferably 30 mol % or less, and particularly in the range from 5 to 20 mol %.

In addition, besides the diamine and the dicarboxylic acid, also lactams such as ε-caprolactam and laurolactam; and aliphatic aminocarboxylic acid such as aminocaproic acid and aminoundecanoic acid, may be used as a co-polymerizable component for composing the polyamide resin (A), without impairing the effects of the present invention.

Most preferable examples of the polyamide resin (A) include poly(meta-xylylene sebacamide) resin, poly(paraxylylene sebacamide) resin, and, poly(meta-xylylene/para-xylylene) copolymeric sebacamide resin obtained by polycondensation of a mixed xylylenediamine of meta-xylylenediamine and para-xylylenediamine, with sebacic acid. Such polyamide resins tend to be improved particularly in the moldability.

The polyamide resin (A) has the terminal amino group concentration ($[NH_2]$) in the range from $5<[NH_2]<150$ (in µeq/g). The terminal amino group concentration ($[NH_2]$) preferably falls in the range of $50<[NH_2]<150$ (in µeq/g), more preferably in the range of $70<[NH_2]<150$ (in µeq/g), and furthermore preferably in the range of $80<[NH_2]<150$ (in µeq/g). By using the polyamide resin with a high terminal amino group content, and by virtue of treatment of the carbon fiber (B) with the amine-reactive compound, the resultant fiber reinforced polyamide resin material may be enhanced in the improving effect of the mechanical properties.

The terminal carboxy group concentration ($[COOH]$) preferably falls in the range of $[COOH]<100$ (in µeq/g), more preferably falls in the range of $5<[COOH]<80$ (in µeq/g), and furthermore preferable in the order below:

the range of $10<[COOH]<80$ (in µeq/g);
the range of $20<[COOH]<70$ (in µeq/g);
the range of $20<[COOH]<60$ (in µeq/g);
the range of $20<[COOH]<50$ (in µeq/g); and
the range of $30<[COOH]<50$ (in µeq/g).

The ratio of the terminal amino group concentration to the terminal carboxy group concentration ($[NH_2]/[COOH]$) is preferably 1.00 or larger, more preferably larger than 1.00, furthermore preferably 1.40 or larger, and particularly 2.00 or larger. The upper limit may be defined, for example, as 3.5 or smaller, while not specifically limited.

Furthermore, as for the terminal amino group concentration ($[NH_2]$), the terminal carboxy group concentration ($[COOH]$), and the relation of the terminal amino group concentration to the terminal carboxy group concentration ($[NH_2]/[COOH]$), a preferable case is represented by $5<[NH_2]<150$ (in µeq/g), $5<[COOH]<80$ (in µeq/g), and $[NH_2]/[COOH]1.00$, respectively; a more preferably case is represented by $5<[NH_2]<150$ (in µeq/g), $5<[COOH]<80$ (in μeq/g), and [NH$_2$]/[COOH]>1.00; a furthermore preferable case is represented by 70<[NH$_2$]<150 (in μeq/g), 20<[COOH]<50 (in μeq/g), and [NH$_2$]/[COOH]≥1.40; and particularly preferable case is represented by 80<[NH$_2$]<150 (in μeq/g), 25<[COOH]<40 (in μeq/g), and [NH$_2$]/[COOH]≥2.00.

By using the polyamide resin which satisfies the relations above, the interface adhesiveness between the polyamide resin and the carbon fiber is improved, and thereby the mechanical characteristics of the molded article are improved.

In particular, for the case where the fiber reinforced polyamide resin material is press-formed within a short time, increase in YI (yellowness index) may be suppressed in a more effective manner even if the polyamide resin is heated, by setting the mole ratio of reaction of polyamide resin to be used to a value larger than 1.0, and, by setting the amino group concentration (preferably, terminal amino group concentration) to a value larger than 50 μeq/g. The polyamide resin has been thought to be apt to gellate and increase YI during melt retention, and to thereby degrade the heat resistance, if the content of amino group is excessive. The present inventors, however, surprisingly found out that increase in YI under heating may be suppressed when the content of amino group in the polyamide resin is excessive. Such tendency becomes more distinctive when 50 mol % or more of the dicarboxylic acid constitutive unit is derived from sebacic acid. The tendency is also effectively expressed by controlling the terminal group of the polyamide resin. This mechanism supposedly relates to suppression of coloring matter from generating, or relates to that the terminal group acts upon the generated coloring matter to suppress it from developing yellow color.

In applications where the polyamide resin is used under heated environment, such as for LED reflector, there has been needs for improving heat aging resistance and for suppressing increase in YI under heating. The present invention is also suitable for such purposes. The above described ranges are also preferable from the viewpoint of adhesiveness to the carbon fiber or metal interface.

The terminal amino group concentration may be measured by dissolving 0.5 g of polyamide resin into 30 ml of a phenol/methanol (4:1) mixed solution under stirring at 20 to 30° C., and titrating the solution with a 0.01 N hydrochloric acid. On the other hand, the terminal carboxy group concentration may be determined by dissolving 0.1 g of polyamide resin into 30 ml of benzyl alcohol at 200° C., adding 0.1 ml of phenol red in the temperature range from 160° C. to 165° C., titrating the solution with a titrating solution prepared by dissolving 0.132 g of KOH into 200 ml of benzyl alcohol (0.01 mol/l in terms of KOH concentration), and finding the end point at which the color changed from yellow to red, and remained in red.

The polyamide resin (A) preferably has a relative viscosity of 1.3 to 3.3, more preferably 1.4 to 3.0, and particularly 1.5 to 2.7. If the relative viscosity of the polyamide (A) is smaller than 1.3, the fluidity of the polyamide resin (A) may easily destabilize to degrade the appearance. On the other hand, if the relative viscosity of the polyamide resin (A) exceeds 3.3, the polyamide resin (A) may destabilize its impregnation property into the carbon fiber or moldability, due to its excessive high melt viscosity.

Now, the relative viscosity is defined by the ratio of efflux time (t) of a solution obtained by dissolving 1 g of polyamide into 100 ml of 96% sulfuric acid, measured at 25° C. in a Cannon-Fenske viscometer, and efflux time (t0) of 96% sulfuric acid per se measured in the same way, as given by the equation (1) below:

$$\text{Relative viscosity} = t/t0 \qquad (1)$$

The number-average molecular weight (Mn) of the polyamide resin (A) is preferably 6,000 to 50,000, and more preferably 6,000 to 30,000. The polyamide resin (A) may reduce the strength if the number-average molecular weight (Mn) falls below 6,000, meanwhile it may be more likely to improve impregnation into the carbon fiber (B) and to thereby improve the strength of the resultant fiber reinforced polyamide resin material or the molded article of the same, if the the number-average molecular weight (Mn) is 50,000 or smaller, and further 30,000 or smaller.

The number-average molecular weight (Mn) is more preferably 8,000 to 28,000, more preferably 9,000 to 26,000, furthermore preferably 10,000 to 24,000, particularly 11,000 to 22,000, and most preferably 12,000 to 20,000. In these ranges, the heat resistance, elastic modulus, dimensional stability, and moldability are further improved.

Now the number-average molecular weight (Mn) in this context may be calculated by the equation below, using the terminal amino group concentration [NH$_2$] (μeq/g) and the terminal carboxy group concentration [COOH] (μeq/g) of the polyamide resin:

$$\text{Number-average molecular weight (Mn)} = 2{,}000{,}000/([\text{COOH}]+[\text{NH}_2])$$

In the polyamide resin (A), the content of a component with a molecular weight of 1,000 or smaller is preferably 5% by mass or less, and more preferably 0.5 to 5% by mass. By limiting the content of such low-molecular-weight component in these ranges, the polyamide resin (A) may more uniformly impregnate into the carbon fiber (B), to thereby improve the strength and warpage resistance of the resultant fiber reinforced polyamide resin material and the molded article of the same. If the content of the low-molecular-weight component exceeds 5% by mass, the component will breed out to reduce the strength and will degrade appearance of the surface.

The content of the component with a molecular weight of 1,000 or smaller is preferably 0.6 to 4.5% by mass, more preferably 0.7 to 4% by mass, particularly 0.8 to 3.5% by mass, more particularly 0.9 to 3% by mass, and most preferably 1 to 2.5% by mass.

The content of the component with a molecular weight of 1,000 or smaller is controllable by melt polymerization conditions including temperature and pressure of polymerization of the polyamide resin (A), and rate of dropwise addition of diamine. In particular, the content is adjustable to an arbitrary ratio, by reducing the pressure of a reactor in the late stage of polymerization, to thereby remove the low-molecular-weight component. Alternatively, the low-molecular-weight component may be removed by hot water extraction of the polyamide resin manufactured by melt polymerization, or by the melt polymerization followed by solid phase polymerization under reduced pressure. In the solid phase polymerization, the content of the low-molecular-weight component is controllable by regulating temperature or the degree of decompression. Alternatively, the content is even controllable by later adding the low-molecular-weight component with a molecular weight of 1,000 or smaller to the polyamide resin.

The content of the component with a molecular weight of 1,000 or smaller may be measured by gel permeation chromatography (GPC) using "HLC-8320GPC" from Tosoh Corporation, and determined as a standard polymethyl methacrylate (PMMA) equivalent value. For the measurement, used are two "TSK Gel Super HM-H" columns, and hexafluoroisopropanol (HFIP) containing 10 mmol/l of sodium trifluoroacetate as a solvent, at a resin concentration of 0.02% by mass, a column temperature of 40° C., a flow rate of 0.3 ml/min, and with a refractive index detector (RI). A calibration curve is prepared by using 6 levels of PMMA solutions dissolved in HFIP.

The polyamide resin (A) preferably contains 0.01 to 1% by mass of cyclic compound. The cyclic compound in the context of the present invention is a compound formed by cyclization of a salt composed of the diamine component and the dicarboxylic acid component, both being the sources of the polyamide resin (A), and may be quantified by the method below.

Pellets of the polyamide resin (A) are ground using an ultracentrifugal grinder, screened through a 0.25-mm mesh, and 10 g of the powder sample with a particle size of 0.25 mm or smaller is weighed in a cylindrical filter paper. The sample powder is extracted in a Soxhlet extractor with 120 ml of methanol for 9 hours, and the obtained extract is condensed to 10 ml in an evaporator taking care so as not to dry it up. If oligomer deposits in this process, remove the oligomer appropriately by filtration through a PTFE filter. The obtained extract is diluted 50 fold using methanol, and is subjected to quantitative analysis using an HPLC apparatus from Hitachi High Technologies Corporation, to thereby determine the content of the cyclic compound.

By containing such range of cyclic compound, the polyamide resin (A) tends to improve the impregnation property into the carbon fiber (B), thereby the resultant fiber reinforced polyamide resin material and the molded article tend to improve their strength, reduce the warpage, and further improve the dimensional stability.

The content of the cyclic compound is more preferably 0.05 to 0.8% by mass, and furthermore preferably 0.1 to 0.5% by mass.

The polyamide resin (A) manufactured by melt polymerization often contains a considerable amount of cyclic compounds which are generally removed by hot water extraction. By controlling the degree of hot water extraction, the content of the cyclic compound is controllable. The control is also available by controlling the pressure of melt polymerization.

The polyamide resin (A) of the present invention preferably has a molecular weight distribution (weight-average molecular weight/number-average molecular weight (Mw/Mn)) of 1.8 to 3.1. The molecular weight distribution is more preferably 1.9 to 3.0, and furthermore preferably 2.0 to 2.9. By controlling the molecular weight distribution in these ranges, the polyamide resin (A) tends to more easily impregnate into the carbon fiber (B), and thereby the fiber reinforced polyamide resin material with good mechanical characteristics tends to be obtained more easily.

The molecular weight distribution of the polyamide resin (A) is adjustable, for example, by properly selecting the species and amount of initiator used for polymerization, and conditions for polymerization reaction such as reaction temperature, pressure and time. The molecular weight distribution is adjustable, still alternatively by mixing two or more species of polyamide resins having different values of average molecular weight obtained under different polymerization conditions, or by subjecting the polymerized polyamide resin to fractional precipitation.

The molecular weight distribution may be determined by GPC measurement. More specifically, by using an apparatus "HLC-8320GPC" from Tosoh Corporation, two "TSK gel Super HM-H" columns from Tosoh Corporation, and hexafluoroisopropanol (HFIP) containing 10 mmol/l of sodium trifluoroacetate as an eluent, the measurement is conducted with a resin concentration of 0.02% by mass, a column temperature of 40° C., a flow rate of 0.3 ml/min, and with a refractive index detector (RI). The obtainable values are those of standard polymethyl methacrylate equivalent. A calibration curve is prepared by using 6 levels of PMMA solutions dissolved in HFIP.

The polyamide resin (A) preferably has a melt viscosity of 50 to 1200 Pa·s, when measured at a temperature 30° C. higher than the melting point of the polyamide resin (A), a shear velocity of 122 $\sec^{-1}$, and a water content of the polyamide resin (A) of 0.06% by mass or less. With the melt viscosity adjusted to these ranges, the polyamide resin (A) will more easily impregnate into the carbon fiber (B). For the measurement where the polyamide resin (A) has two or more endothermic peaks in the process of heating measured by the DSC method as described later, the melting point is defined by the temperature at the top of the endothermic peak which appears in the highest temperature range.

The melt viscosity more preferably falls in the range from 60 to 500 Pa·s, and more preferably from 70 to 100 Pa·s.

The melt viscosity of the polyamide resin is adjustable, for example, by properly selecting the compositional ratio of loading of the source dicarboxylic acid and diamine, polymerization catalyst, molecular weight modifier, polymerization temperature, and polymerization time.

The polyamide resin (A) preferably has a flexural modulus retention at the time of absorbing water of 85% or larger. By adjusting the flexural modulus retention in absorbing water into this range, the resultant fiber reinforced polyamide resin material and the molded article will be less likely to degrade in physical properties, and will be less likely to cause changes of form such as warpage.

The flexural modulus retention at the time that the polyamide resin absorbs water in this context is defined by the ratio (%) of flexural modulus of a bending test piece composed of the polyamide resin (A) under 0.5%-by-mass water absorption, relative to flexural modulus of the test piece under 0.1%-by-mass water absorption, wherein a larger value means a smaller tendency of reduction in the flexural modulus even if the polyamide resin absorbs moisture.

The flexural modulus retention at the time that the polyamide resin absorbs water is more preferably 90% or larger, and furthermore preferably 95% or larger.

The flexural modulus retention at the time that the polyamide resin (A) absorbs water in absorbing water is controllable, for example, based on the ratio of mixing of para-xylylenediamine and meta-xylylenediamine, wherein the larger the ratio of para-xylylenediamine, the better the flexural modulus retention. It is also adjustable by controlling crystallinity of the bending test piece.

The percentage of water absorption of the polyamide resin (A), when measured after immersing it in water at 23° C. for one week, and immediately after it was taken out from water and wiped, is preferably 1% by mass or less, more preferably 0.6% by mass or less, and furthermore preferably 0.4% by mass or less. With these ranges, the resultant fiber reinforced polyamide resin material and the molded article will be more easily prevented from deforming due to water absorption, the fiber reinforced polyamide resin material will be suppressed from foaming in the process of molding under heating and pressurizing, and thereby the molded article with less bubbles will be obtained.

The polyamide resin (A) used in the present invention preferably has a reactive functional group concentration of 40 μeq/g or more, and more preferably 80 μeq/g or more. The reactive functional group concentration in this context is defined by the concentration (μeq/g) of reactive group which resides at the terminal or on the principal chain or side chains of the polyamide resin (A), wherein the reactive group is representatively an amino group and carboxy group. Considering configuration of source monomers, for some cases where the reactive functional group theoretically resides only at the polymer terminal, the terminal reactive functional group concentration will be substantially equal to the reactive functional group concentration, which is a preferable embodiment for the present invention. By virtue of the concentration of the reactive functional group such as high as 80 μeq/g or above, the carbon fiber (B), even with a less amount of the compound (C) over the surface thereof, will be able to keep good adhesion to the surface of the polyamide resin (A). Since the carbon fiber (B) with a less amount of the compound (C) over the surface thereof may be used, the polyamide resin (A) will now quickly impregnate into the carbon fiber (B), and thereby the cycle time of molding may be shortened. Also adhesion to metal surfaces may be improved. Accordingly, the fiber reinforced polyamide resin material of the present invention is advantageously used for the purpose of combining the polyamide resin molded article with metals. For the purpose of improving adhesion between metals and the fiber reinforced polyamide resin material, it is preferable, prior to bring the molten polyamide resin material into contact with the metal surfaces, to enhance reactivity of the metal surfaces by any of publicly-known techniques such as corona treatment, or to produce a fine irregularity over the surface.

The reactive functional group concentration is preferably 80 μeq/g or more, more preferably 90 μeq/g or more, and particularly 100 μeq/g or more. The upper limit is preferably 250 μeq/g or below, more preferably 230 μeq/g or below, furthermore preferably 210 μeq/g or below, and particularly 200 μeq/g or below. In the present invention, it is particularly preferable that the total concentration of the terminal amino group and terminal carboxy group in the polyamide resin (A) falls in the range of reactive functional group concentration.

The polyamide resin (A) of the present invention preferably has a ratio by mole of reacted diamine unit relative to the reacted dicarboxylic acid unit (amount by mole of reacted diamine unit/amount by mole of reacted dicarboxylic acid, referred to as "mole ratio of reaction", hereinafter) of 0.970 to 1.030. With this range, the polyamide resin (A) will be more easily controllable in the molecular weight and molecular weight distribution, to arbitrary ranges.

The mole ratio of reaction is preferably 0.980 or larger, more preferably 0.990 or larger, furthermore preferably 1.00 or larger, still preferably 1.001 or larger, particularly 1.003 or larger, and most preferably 1.005 or larger. The upper limit of the mole ratio of reaction is 1.03 or below, more preferably 1.020 or below, furthermore preferably 1.015 or below, and still more preferably 1.010 or below.

As one preferable embodiment of the present invention, exemplified is a case where the mole ratio of reaction is 1.0 or larger, and a reactive functional group concentration is 40 μeq/g or above. With these ranges, even if the amount of mixing of the compound (C) which is reactive with amino group is as small as 1.5% by mass or less, the resin molded article with high bending strength is obtainable by press molding within a short time. In particular, by using an amino group-rich polyamide resin, and by adjusting the reactive functional group concentration to a high level as described above, the impact resistance and flexibility may be improved. Also by adjusting the mole ratio of reaction within the above-described range, increase in YI may be suppressed effectively even if the polyamide resin (A) is heated. Moreover, the polyamide resin (A) is well reactive in the process of polymerization, less causative of degradation during the polymerization, and thereby the resin with good quality is obtainable.

Now, the mole ratio of reaction (r) may be determined by the equation below, described in Kogyo Kagaku Zasshi (=Journal of the Chemical Society of Japan), Vol. 74, No. 7 (1971), p. 162-167:

$$r=(1-cN-b(C-N))/(1-cC+a(C-N))$$

where,
a: $M_1/2$
b: $M_2/2$
c: 18.015 (molecular weight of water (g/mol))
$M_1$: molecular weight of diamine (g/mol)
$M_2$: molecular weight of dicarboxylic acid (g/mol)
N: terminal amino group concentration (eq/g)
C: terminal carboxy group concentration (eq/g)

When the polyamide resin (A) is synthesized from monomers with different molecular weights respectively used as the diamine component and the carboxylic acid component, M1 and M2 are of course calculated according to the ratio of mixing (mole ratio) of such source monomers. Assuming the synthesis vessel as a perfect closed system, the mole ratio of loaded monomers and the mole ratio of reaction should agree. Actual synthetic apparatus, however, cannot be a perfect closed system, in which the mole ratio of loading and the mole ratio of reaction do not always agree. Also since the loaded monomer does not always react completely, so that the mole ratio of loading and mole ratio of reaction again do not always agree. The mole ratio of reaction therefore means the mole ratio of the monomers actually reacted, determined based on the concentration of terminal groups of the resultant polyamide resin (A). "N" is preferably the terminal amino group concentration, and "C" is preferably the terminal carboxy group concentration.

In the present invention, the polyamide resin (A) preferably has a melting point of 150 to 310° C., more preferably 160 to 300° C., furthermore preferably 170 to 290° C., and particularly 190 to 290° C. With these ranges, the polyamide resin (A) will tend to show better adhesion to the carbon fiber (B), and thereby the fiber reinforced polyamide resin material with good mechanical characteristics tends to be obtained more easily.

The polyamide resin (A) preferably has a glass transition point of 50 to 100° C., more preferably 55 to 100° C., and particularly 60 to 100° C. With these ranges, the heat resistance tends to improve.

The melting point is defined by the temperature corresponded to the top of endothermic peak observed in the process of temperature elevation in DSC (differential scanning calorimetry). The glass transition point is determined by once heating and melting a sample so as to eliminate any possible effects of thermal history on the crystallinity, and by heating again for measurement. The measurement is conducted, for example, by using "DSC-60" from Shimadzu Corporation, approximately 5 mg of sample, and nitrogen as an atmospheric gas at a flow rate of 30 ml/min, and by heating the sample at a rate of temperature elevation of 10° C./min from room temperature up to an expected melting point or above for melting, wherein the melting point is determined from the temperature corresponded to the top of the endothermic peak observed in this process. Next, the molten polyamide resin (A) is rapidly cooled with dry ice, and the sample is again heated at a rate of heating of 10° C./min up to the melting point or above, to successfully determine the glass transition point.

The polyamide resin (A) also preferably has at least two endothermic peaks observed in the process of temperature elevation in DSC. The polyamide resin having at least two endothermic peaks is preferable, since the fiber reinforced polyamide resin material tends to improve the moldability when the fiber reinforced polyamide resin material is molded.

The polyamide resin having at least two endothermic peaks is preferably exemplified by a polyamide resin in which 70 mol % or more of the diamine constitutive unit is derived from xylylenediamine, and 50 mol % or more of the dicarboxylic acid constitutive unit is derived from sebacic acid, wherein the xylylenediamine unit contains 50 to 100 mol % of para-xylylenediamine-derived unit, and 0 to 50 mol % of meta-xylylenediamine-derived unit, having a number-average molecular weight (Mn) of 6,000 to 30,000, and having at least two melting points.

In this case, two or more endothermic peaks generally reside in the range from 250 to 330° C., preferably from 260 to 320° C., more preferably from 270 to 310° C., and particularly from 275 to 305° C. With two or more endothermic peaks preferably fallen in these temperature ranges, the polyamide resin will have good heat resistance and moldability.

[Method for Manufacturing Polyamide Resin (A)]

The polyamide resin (A) may be manufactured by any of publicly known methods and conditions for polymerization, without special limitation. In the process of polycondensation of the polyamide resin, a small amount of monoamine or monocarboxylic acid may be added as a molecular weight modifier. An exemplary method for manufacturing is such that heating a salt composed of diamine including xylylenediamine, and dicarboxylic acid such as adipic acid, sebacic acid and so forth under the presence of water and under pressure, and allowing the mixture to polymerize in a molten state, while removing the added water and water produced from the condensation process.

The polyamide resin (A) may be manufactured alternatively by directly adding xylylenediamine to the molten dicarboxylic acid, so as to proceed polycondensation under normal pressure. In this case, the polycondensation is allowed to proceed by continuously adding the diamine to the dicarboxylic acid, in order to keep the reaction system in the state of uniform liquid, while heating the reaction system so that the reaction temperature does not fall under the melting point of oligoamide and polyamide produced therein.

The polyamide resin (A), after manufactured by melt polymerization, may further be subjected to solid phase polymerization. The solid phase polymerization may be proceeded according to any of publicly known methods and conditions for polymerization, without special limitation.

The mole ratio of reaction of the polyamide resin (A) is adjustable by properly selecting reaction conditions which include the mole ratio of loading of the source dicarboxylic acid component and the diamine component, reaction time, reaction temperature, rate of dropwise addition of xylylenediamine, pressure in the reaction vessel, and commencing time of decompression.

For the case where the method for manufacturing the polyamide resin is so-called salt process, the mole ratio of reaction is adjustable to 0.97 to 1.02, specifically by setting the value of source diamine/source dicarboxylic acid in this range, and by allowing the reaction to proceed thoroughly. If the method relies upon continuous dropping of the diamine into the molten dicarboxylic acid, the mole ratio is also adjustable not only by adjusting the ratio of loading in this range, but also by controlling the amount of diamine to be refluxed during the dropwise addition of diamine, to thereby eliminate the dropped diamine out of the reaction system. The diamine may be eliminated specifically by controlling the temperature of a reflux column in an appropriate temperature range, or by properly controlling the amount and geometry of packing in the packed column, such as so-called Raschig ring, Lessing ring, saddle and so forth. Unreacted diamine is removable alternatively by shortening the reaction time after the dropwise addition of diamine. The unreacted diamine is removable as required, still alternatively by controlling the rate of dropwise addition of diamine. By these methods, the mole ratio of reaction is controlled within a desired range even if the ratio of loading falls outside the desired range.

The polyamide resin (A) having at least two endothermic peaks is obtainable by melt polymerization, while preferably applying the methods (1), (2) or (3) below, independently or by combination of a plurality of methods.

(1) A method which includes, in the process of manufacturing the polyamide resin, a step of drawing the polyamide resin in a strand form out from a polymerization reaction vessel, while keeping the temperature between the melting point of polyamide resin and (melting point+20° C.); and a step of cooling the drawn polyamide resin strand in cooling water at 0 to 60° C.

(2) A method which includes, preceding to the step of drawing the polyamide resin in a strand form out from the polymerization reaction vessel, a step of melting dicarboxylic acid; a step of continuously dropping diamine into the molten dicarboxylic acid; succeeding to the dropwise addition of diamine, a step of keeping the mixture in the temperature range between the melting point of polyamide resin and (melting point+30° C.) for 0 to 60 minutes; and a step of allowing the polycondensation reaction to continue under reduced pressure.

(3) A method which includes, preceding to the step of drawing the polyamide resin in a strand form out from the polymerization reaction vessel, a step of keeping a salt composed of dicarboxylic acid and diamine in a molten state under pressure; a step of elevating the temperature while reducing the pressure; and a step of keeping the mixture in the temperature range between the melting point of the polyamide resin and (melting point+30° C.) for 0 to 60 minutes.

Note that the melting point in the methods (1) to (3) above is defined by the temperature at the top of the endothermic peak which appears in the highest temperature range, out of a plurality of peaks which are observed in DSC.

In the method (1), the temperature of the polyamide resin when drawn in the form of strand preferably falls between the melting point and (melting point+15° C.). The strand is cooled in cooling water at 0 to 60° C., preferably at 10 to 50° C., and more preferably at 20 to 45° C.

The time over which the strand is brought into contact with the cooling water is preferably 2 to 60 seconds from the viewpoint of the moisture content of resin and productivity, and more preferably 5 to 50 seconds. The cooling time is properly adjustable by the length of path along which the strand is brought into contact with water in a cooling bath, the length of the cooling bath, and the time over which the cooling water is sprayed onto the strand.

The drawing speed of strand is preferably 100 to 300 m/min, from the viewpoint of the moisture content of pellet and productivity, more preferably 120 to 280 m/min, furthermore preferably 140 to 260 m/min, and particularly 150 to 250 m/min. The drawing speed of strand is adjustable by controlling the rotating speed of a cutting blade of a pelletizer, and the pressure of the reaction vessel in the process of drawing.

The method (2) includes, preceding to the step of drawing the polyamide resin in a strand form out from the polymerization reaction vessel, a step of melting dicarboxylic acid; a step of continuously dropping diamine into the molten dicarboxylic acid; succeeding to the dropwise addition of diamine, a step of keeping the mixture in the temperature range between the melting point of polyamide resin and (melting point+30° C.) for 0 to 60 minutes; and a step of allowing the polycondensation reaction to continue under reduced pressure.

In the step of melting the dicarboxylic acid, a solid dicarboxylic acid may be loaded into the reaction vessel, prior to the polycondensation process, followed by heating for melting; or a preliminarily melted dicarboxylic acid may be loaded into the reaction vessel.

In the step of continuously dropping diamine into the molten dicarboxylic acid, it is preferable to continuously elevate the temperature in the reaction vessel as the amount of dropping of diamine increases, while controlling the reaction vessel in the temperature range from the temperature at which the produced polyamide oligomer does not solidify, up to (the non-solidification temperature+30° C.). Upon completion of the dropwise addition of the whole amount of diamine, the temperature in the reaction vessel preferably falls in the range between the melting point of polyamide resin and (melting point+30° C.). During the process, the inside of the reaction vessel is preferably replaced by nitrogen. During the process, the content of the reaction vessel is preferably stirred with a stirring blade to keep the content as a uniform fluid.

During the process, the inside of the reaction vessel is preferably pressurized, preferably at 0.1 to 1 MPa, more preferably at 0.2 to 0.6 MPa, and furthermore preferably at 0.3 to 0.5 MPa. Pressure may be applied with nitrogen, or with water vapor. After going through these steps, the polyamide resin with a uniform properties may be produced with good productivity.

In the method (2), after going through the step of keeping the mixture in the temperature range between the melting point of polyamide resin and (melting point+30° C.) for 0 to 60 minutes, and further through the step of allowing the polycondensation reaction to continue under reduced pressure, the polyamide resin thus obtained tends to have a plurality of endothermic peaks.

If the step of keeping the mixture in the temperature range between the melting point of polyamide resin and (melting point+30° C.) takes 60 minutes or longer, the polyamide resin may unfortunately have a single endothermic peak. The step of keeping in the temperature range between the melting point and (melting point+30° C.) preferably takes 1 to 40 minutes, more preferably takes 1 to 30 minutes, and particularly takes 1 to 20 minutes.

In the process of maintaining the polycondensation reaction under reduced pressure, the pressure is preferably 0.05 MPa or larger and less than the atmospheric pressure, more preferably 0.06 to 0.09 MPa, and more preferably 0.07 to 0.085 MPa. The time of the process preferably ranges from 1 to 60 minutes, more preferably from 1 to 40 minutes, furthermore preferably from 1 to 30 minutes, and particularly from 1 to 20 minutes. The reaction temperature preferably ranges from the melting point to (melting point+30° C.), and more preferably from the melting point to (melting point+20° C.) By maintaining the polycondensation reaction under the reduced pressure conditions described above, the polyamide resin is adjustable to have a desired molecular weight, and to give the polyamide resin a plurality of endothermic peaks.

The method (3) includes a step of keeping a salt composed of dicarboxylic acid and diamine in a molten state under pressure; a step of elevating the temperature while reducing the pressure; and a step of keeping the mixture in the temperature range between the melting point of the polyamide resin and (melting point+30° C.) for 0 to 60 minutes.

The step of keeping a salt composed of dicarboxylic acid and diamine in a molten state under pressure, and the step of elevating the temperature while reducing the pressure, are those of general salt method. In the step of keeping a salt composed of a dicarboxylic acid and a diamine in a molten state under pressure, the salt is preferably kept in a temperature range from the melting point of polyamide oligomer up to (melting point+30° C.), more preferably from the melting point of the polyamide oligomer up to (melting point+20° C.); under pressure in reaction vessel preferably from 1 to 2 MPa, and more preferably from 1.5 to 1.9 MPa; for preferably 60 to 300 minutes, and more preferably 90 to 240 minutes.

In the step of elevating the temperature while reducing the pressure, the rate of pressure reduction is preferably controlled in the range from 1 to 2 MPa/hour, more preferably from 1.5 to 1.8 MPa/hour, and the rate of elevation of temperature is preferably controlled to 10 to 100° C./hour, and more preferably from 20 to 80° C./hour. The pressure at which the salt is maintained after the pressure reduction and temperature elevation is preferably in the range from 0.05 MPa or larger and smaller than the atmospheric pressure, more preferably from 0.06 to 0.09 MPa, and furthermore preferably from 0.07 to 0.085 MPa. The process time is preferably 1 to 60 minutes, more preferably 1 to 40 minutes, furthermore preferably 1 to 30 minutes, and particularly 1 to 20 minutes. The temperature in this process preferably falls in the range from the melting point up to (melting point+30° C.), and more preferably from the melting point to (melting point+20° C.)

The salt is maintained in a temperature range from the melting point of the polyamide resin up to (melting point+30° C.), for 0 to 60 minutes. After going through these steps, the resultant polyamide resin will have a plurality of endothermic peaks. If the step of maintaining the salt, in the temperature range from the melting point of the polyamide resin up to (melting point+30° C.), is longer than 60 minutes, the polyamide resin may unfortunately have a single endothermic peak. The step of maintaining the salt in the temperature range from the melting point up to (melting point+30° C.) preferably takes 1 to 40 minutes, more preferably takes 1 to 30 minutes, and particularly takes 1 to 20 minutes.

The polyamide resin (A) may be mixed with other polyamide resin or elastomer component. Such other polyamide resin is exemplified by polyamide 66, polyamide 6, polyamide 46, polyamide 6/66, polyamide 10, polyamide 612, polyamide 11, polyamide 12, hexamethylene diamine, polyamide 66/6T composed of adipic acid and terephthalic acid, hexamethylene diamine, and polyamide 6I/6T composed of isophthalic acid and terephthalic acid.

Examples of usable elastomer component include publicly-known elastomers such as polyolefin-based elastomer, diene-based elastomer, polystyrene-based elastomer, polyamide-based elastomer, polyester-based elastomer, polyurethane-based elastomer, fluorine-containing elastomer, and silicone-based elastomer. The polyolefin-based elastomer and polystyrene-based elastomer are preferable.

In order to impart compatibility with the polyamide resin (A), it is also preferable to use, as the elastomer, a modified elastomer which is modified under the presence or absence of a radical initiator, using α,β-unsaturated carboxylic acid and acid anhydride thereof, or using acrylamide and derivatives thereof.

The content of such elastomer component in the polyamide resin (A) is generally 30% by mass or less, preferably 20% by mass or less, and particularly 10% by mass or less.

The polyamide resin (A) described above may be a single species, or any mixture of two or more species.

It is also possible to add a single species or two or more species selected from polyester resin, polyolefin resin, polyphenylene sulfide resin, polycarbonate resin, and polyphenylene ether resin, polystyrene resin, without impairing the objects and effects of the present invention.

The content of such other polyamide resin in the polyamide resin (A) is generally 30% by mass or less, preferably 20% by mass or less, and particularly 10% by mass or less.

[Other Components]

In the present invention, the polyamide resin may be added with additives such as nucleating agent, antioxidant, stabilizer such as heat stabilizer, hydrolysis resistance modifier, weathering stabilizer, matting agent, UV absorber, plasticizer, dispersant, flame retardant, antistatic agent, coloration inhibitor, anti-gelling agent, colorant, and mold releasing agent, without impairing the effects of the present invention.

[Nucleating Agent (Crystal Nucleating Agent)]

It is also preferable to mix a nucleating agent to the polyamide resin (A). By mixing the nucleating agent, the rate of semi-crystallization of the polyamide resin (A) may be increased, and thereby the interfacial shear strength between the polyamide resin (A) and the carbon fiber (B) may further be elevated. The crystal nucleating agent is appropriately selectable, depending on a required level of moldability. The crystal nucleating agent is exemplified by talc and boron nitride which are generally used, and also by organic nucleating agent. When the organic nucleating agent or boron nitride is used as the nucleating agent, the content of which is preferably 0.001 to 6 parts by mass per 100 parts by mass of the polyamide resin (A), more preferably 0.02 to 2 parts by mass, and furthermore preferably 0.05 to 1 part by mass. When the talc is used, the content of which is preferably 0.1 to 8 parts by mass, and more preferably 0.3 to 2 parts by mass. When any inorganic nucleating agent other than talc and boron nitride is used, the contents of which are preferably 0.3 to 8 parts by mass, and more preferably 0.5 to 4 parts by mass. Too small content may result in a tendency of poor effect of the nucleating agent, meanwhile too large content may induce a foreign matter effect, which may result in degraded mechanical strength and impact resistance. The talc or boron nitride is preferable, from the viewpoints of mechanical characteristics including impact resistance, tensile elongation and bending deflection.

The talc preferably has a number-average particle size of 2 μm or smaller. The boron nitride preferably has a number-average particle size of 10 μm or smaller in general, preferably 0.005 to 5 μm, and more preferably 0.01 to 3 μm. The number-average particle size of talc is generally a value obtained by measurement using a laser diffraction/scattering particle size analyzer.

[Stabilizer]

The polyamide resin (A) is preferably mixed with a stabilizer (antioxidant, heat stabilizer). The stabilizer is preferably organic stabilizers such as phosphorus-containing, hindered phenol-based, hindered amine-based, oxanilide-based, organic sulfur-containing, and aromatic secondary amine-based ones; and inorganic stabilizers such as amine-based antioxidant, copper compound and halogenated compound. The phosphorus-containing stabilizer is preferably phosphite compound or phosphonite compound.

Preferable examples of the phosphite compound is preferably exemplified by distearyl pentaerythritol diphosphite, dinonylphenylpentaerythritol diphosphite, bis(2,4-di-t-butylphenyl)pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-sec-butylphenyl)pentaerythritol diphosphite, bis (2,6-di-t-butyl-4-t-octylphenyl)pentaerythritol diphosphite, and bis(2,4-dicumylphenyl)pentaerythritol diphosphite, and particularly preferable examples include bis(2,6-di-t-butyl-4-methylphenyl)pentaerythritol diphosphite, and bis(2,4-dicumylphenyl)pentaerythritol diphosphite.

Preferable examples of the phosphonite compound include tetrakis(2,4-di-t-butylphenyl)-4,4'-biphenylenediphosphonite, tetrakis(2,5-di-t-butylphenyl)-4,4'-biphenylenediphosphonite, tetrakis(2,3,4-trimethylphenyl)-4,4'-biphenylenediphosphonite, tetrakis(2,3-dimethyl-5-ethylphenyl)-4,4'-biphenylenediphosphonite, tetrakis(2,6-di-t-butyl-5-ethylphenyl)-4,4'-biphenylenediphosphonite, tetrakis(2,3,4-tributylphenyl)-4,4'-biphenylenediphosphonite, and tetrakis(2,4,6-tri-t-butylphenyl)-4,4'-biphenylenediphosphonite, and particularly preferable examples include tetrakis(2,4-di-t-butylphenyl)-4,4'-biphenylenediphosphonite.

The hindered phenol-based stabilizer is exemplified by n-octadecyl-3-(3,5-di-t-butyl-4-hydroxyphenyl)propionate, 1,6-hexanediol-bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy}ethyl]-2,4,8,10-tetraoxaspiro[5.5]undecane, triethylene glycol-bis[3-(3-t-butyl-5-methyl-4-hydroxyphenyl)propionate], 3,5-di-t-butyl-4-hydroxybenzylphosphonate-diethyl ester, 1,3,5-trimethyl-2,4,6-tris(3,5-di-t-butyl-4-hydroxybenzyl) benzene, 2,2-thio-diethylenebis[3-(3,5-di-t-butyl-4-hydroxyphenyl)propionate], tris(3,5-di-t-butyl-4-hydroxybenzyl)isocyanurate, and N,N'-hexamethylene bis (3,5-di-t-butyl-4-hydroxy-hydrocinnamide). Among them, n-octadecyl-3-(3,5-di-t-butyl-4-hydroxyphenyl)propionate, 1,6-hexanediol-bis[3-(3,5-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy}ethyl]-2,4,8,10-tetraoxaspiro[5.5]undecane, and N,N'-hexamethylene bis(3,5-di-t-butyl-4-hydroxy-hydrocinnamide) are preferable.

The hindered amine-based stabilizer is exemplified by publicly-known hindered amine compounds having a 2,2,6,6-tetramethylpiperidine skeleton. Specific examples of the hindered amine compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6- tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl) carbonate, bis(2,2,6,6-tetramethyl-4-piperidyl) oxalate, bis(2,2,6,6-tetramethyl-4-piperidyl) malonate, bis(2,2,6,6-tetramethyl-4-piperidyl) sebacate, bis(2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy) ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl)hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{β-(3,5-di-t-butyl-4-hydroxyphenyl)propionyloxy}butyl]-4-[3-(3,5-di-t-butyl-4-hydroxyphenyl)propionyloxy]-2,2,6,6-tetramethylpiperidine, condensate of 1,2,3,4-butanetetracarboxylic acid and 1,2,2,6,6-pentamethyl-4-piperidinol and β,β,β',β'-tetramethyl-3,9-[2,4,8,10-tetraoxaspiro[5.5]undecane]diethanol, polycondensate of succinic acid and dimethyl-1-(2-hydroxyethyl)-4-hydroxy-2,2,6,6-tetramethylpiperidine, and 1,3-benzenedicarboxamide-N,N'-bis(2,2,6,6-tetramethyl-4-piperidyl).

The amine-based antioxidant refers to amine compounds other than the hindered amine-based stabilizer described above, and examples of which include reaction products formed between N-phenylbenzeneamine and 2,4,4-trimethylpentene, octylated diphenylamine, N,N'-diphenyl-p-phenylenediamine, N-phenyl-N'-isopropyl-p-phenylenediamine, N-phenyl-N'-(1,3-dimethylbutyl)-p-phenylenediamine, N,N'-di-2-naphthyl-p-phenylenediamine, 2,2,4-trimethyl-1,2-dihydroquinoline polymer, and 6-ethoxy-1,2-dihydro-2,2,4-trimethylquinoline.

Preferable examples of the oxanilide-based stabilizer include 4,4'-dioctyloxyoxanilide, 2,2'-diethoxyoxanilide, 2,2'-dioctyloxy-5,5'-di-tert-butoxianilide, 2,2'-didodecyloxy-5,5'-di-tert-butoxanilide, 2-ethoxy-2'-ethyloxanilide, N,N'-bis(3-dimethylaminopropyl)oxanilide, 2-ethoxy-5-tert-butyl-2'-ethoxanilide and mixture thereof with 2-ethoxy-2'-ethyl-5,4'-di-tert-butoxanilide, mixture of o- and p-methoxy-disubstituted oxanilides, and mixture of o- and p-ethoxy-disubstituted oxanilides.

Examples of the organic sulfur-containing stabilizer include organic thio acid-based compounds such as didodecylthio dipropionate, ditetradecylthio dipropionate, dioctadecylthio dipropionate, pentaerythritol tetrakis(3-dodecylthiopropionate), and thiobis(N-phenyl-β-naphthylamine); mercaptobenzimidazole-based compounds such as 2-mercaptobenzothiazole, 2-mercaptobenzimidazole, 2-mercaptomethylbenzimidazole and metal salt of 2-mercaptobenzimidazole; dithiocarbamic acid-based compounds such as metal salts of diethyldithiocarbamic acid, and metal salts of dibutyldithiocarbamic acid; and thiourea-based compounds such as 1,3-bis(dimethylaminopropyl)-2-thiourea, and tributylthiourea; tetramethylthiuram monosulfide, tetramethylthiuram disulfide, nickel dibutyldithiocarbamate, nickel isopropyl xanthate, and trilauryl trithiophosphite.

Among them, mercaptobenzimidazole-based compound, dithiocarbamic acid-based compound, thiourea-based compound, and organic thio acid-based compound are preferable, and mercaptobenzimidazole-based compound, and organic thio acid-based compound are more preferable. In particular, the thioether-based compound having a thioether structure is preferably used, since the compound can accept oxygen from an oxidized compound to reduce it. More specifically, 2-mercaptobenzimidazole, 2-mercaptomethylbenzimidazole, ditetradecylthio dipropionate, dioctadecylthio dipropionate, and pentaerythritol tetrakis(3-dodecylthiopropionate) are more preferable; ditetradecylthio dipropionate, pentaerythritol tetrakis(3-dodecylthiopropionate), and 2-mercaptomethylbenzimidazole are furthermore preferable; and pentaerythritol tetrakis(3-dodecylthiopropionate) is particularly preferable.

The molecular weight of the organic sulfur-containing compound is generally 200 or larger, and preferably 500 or larger, wherein the upper limit is generally 3,000.

The aromatic secondary amine-based stabilizer is preferably compound having a diphenylamine skeleton, compound having a phenylnaphthylamine skeleton, or compound having a dinaphthylamine skeleton, and is more preferably compound having a diphenylamine skeleton, or compound having a phenylnaphthylamine skeleton. Specific examples include compound having a diphenylamine skeleton such as p,p'-dialkyldiphenylamine (alkyl group has 8 to 14 carbon atoms), octylated diphenylamine, 4,4'-bis(α,α-dimethylbenzyl)diphenylamine, p-(p-toluenesulfonylamide) diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenediamine; compounds having a phenylnaphthylamine skeleton such as N-phenyl-1-naphthylamine and N,N'-di-2-naphthyl-p-phenylenediamine; and compounds having a dinaphthylamine skeleton such as 2,2'-dinaphthylamine, 1,2'-dinaphthylamine and 1,1'-dinaphthylamine. Among them, 4,4'-bis(α,α-dimethylbenzyl)diphenylamine, N,N'-di-2-naphthyl-p-phenylenediamine and N,N'-diphenyl-p-phenylenediamine are more preferable, and N,N'-di-2-naphthyl-p-phenylenediamine and 4,4'-bis(α,α-dimethylbenzyl)diphenylamine are particularly preferable.

For the case where the organic sulfur-containing stabilizer or the aromatic secondary amine-based stabilizer is mixed, it is preferable to use both of them. By using them in combination, the heat aging resistance of the polyamide resin (A) tends to be more improved than in the case where they were used independently.

More specific examples of such combination of the organic sulfur-containing stabilizer and the aromatic secondary amine-based stabilizer include combinations of at least one organic sulfur-containing stabilizer selected from ditetradecylthio dipropionate, 2-mercaptomethylbenzimidazole and pentaerythritol tetrakis(3-dodecylthiopropionate); and at least one aromatic secondary amine-based stabilizer selected from 4,4'-bis(α,α-dimethylbenzyl)diphenylamine and N,N'-di-2-naphthyl-p-phenylenediamine. A more preferable combination is composed of pentaerythritol tetrakis(3-dodecylthiopropionate) as the organic sulfur-containing stabilizer, and N,N'-di-2-naphthyl-p-phenylenediamine as the aromatic secondary amine-based stabilizer.

When the organic sulfur-containing stabilizer and the aromatic secondary amine-based stabilizer are used together, the ratio of content (ratio by mass), represented by aromatic secondary amine-based stabilizer/organic sulfur-containing stabilizer, is preferably 0.05 to 15, more preferably 0.1 to 5, and furthermore preferably 0.2 to 2. With such ratio of content, the heat aging resistance may be improved in an efficient manner, while keeping the barrier performance.

The inorganic stabilizer is preferably copper compound or halide.

The copper compound is any of various copper salts of inorganic acid and or organic acid, excluding halides described later. Copper may be either cuprous or cupric. The copper salt is exemplified by copper chloride, copper bromide, copper iodide, copper phosphate, copper stearate, and natural ores such as hydrotalcite, stichtite, and pyrolite.

The halide used as the inorganic stabilizer is exemplified by halides of alkaline metal or alkaline earth metal; ammonium halide and halide of quaternary ammonium of organic compound; and organic halide such as alkyl halide and allyl halide, wherein examples of which include ammonium iodide, stearyltriethylammonium bromide, and benzyltriethylammonium iodide. Among them, preferable are alkali metal halide such as potassium chloride, sodium chloride, potassium bromide, potassium iodide, and sodium iodide.

Combined use of the copper compound and the halide, and in particular, combined use of the copper compound and the alkali metal halide is preferable since good effects are expected in terms of heat discoloration resistance and weatherability (light resistance). For an exemplary case where the copper compound is independently used, the molded article may sometimes be colored in reddish brown due to copper, which is undesirable for some applications. By using the copper compound and the halide in combination, it is now possible to prevent color change into reddish brown.

In the present invention, among the stabilizer described above, amine-based antioxidant; and, inorganic, organic sulfur-containing, and aromatic secondary amine-based stabilizers are particularly preferable, from the viewpoints of working stability under heating and pressure, heat aging resistance, appearance of the film, and prevention of coloration.

The content of the stabilizer, per 100 parts by mass of polyamide resin (A), is generally 0.01 to 1 parts by mass, and preferably 0.01 to 0.8 parts by mass. By adjusting the content to 0.01 parts by mass or more, the effects of suppressing color change, and of improving weatherability/light resistance are fully exhibited, wherein the mechanical characteristics are suppressed from degrading with an amount of mixing of 1 part by mass or less.

[Hydrolysis Resistance Modifier—Carbodiimide Compound]

The polyamide resin (A) is preferably mixed with a carbodiimide compound as the hydrolysis resistance modifier. The carbodiimide compound is exemplified by aromatic, aliphatic and alicyclic polycarbodiimide compounds manufactured by various methods. Among them, from the viewpoint of good melt kneadability in the extrusion process, aliphatic or alicyclic polycarbodiimide compound is preferable, and alicyclic polycarbodiimide compound is more preferably used.

These carbodiimide compounds may be manufactured by decarboxylation condensation of organic polyisocyanate. Exemplified is a method of synthesis which allows various organic polyisocyanates to proceed decarboxylation condensation at approximately 70° C. or above in an inert solvent, or without using solvent, in the presence of a carbodiimidation catalyst. The ratio of content of isocyanate group is preferably 0.1 to 5%, and more preferably 1 to 3%. With this range, the carbodiimide compound can react with the polyamide resin (A) more easily, to thereby improve the hydrolysis resistance.

Examples of the organic polyisocyanate, usable here as a synthetic source of the carbodiimide compound, include various organic diisocyanate such as aromatic diisocyanate, aliphatic diisocyanate, and alicyclic diisocyanate, and mixtures of them.

The organic diisocyanate is specifically exemplified by 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, and methylenebis(4,1-cyclohexylene)diisocyanate, wherein two or more species of which may be used in combination. Among them, dicyclohexylmethane-4,4-diisocyanate, and methylenebis(4,1-cyclohexylene)diisocyanate are preferable.

In order to control the degree of polymerization by blocking the terminal of the carbodiimide compound, it is also preferable to use a terminal blocking agent such as monoisocyanate. The monoisocyanate is exemplified by phenylisocyanate, tolyl isocyanate, dimethylphenylisocyanate, cyclohexylisocyanate, and butylisocyanate, naphthylisocyanate, wherein two or more species of which may be used in combination.

Note that the terminal blocking agent is not limited to the monoisocyanate, and may be any active hydrogen-containing compound capable of reacting with isocyanate. Such active hydrogen-containing compound is selectable from aliphatic, aromatic and alicyclic compounds, exemplified by —OH group-containing compounds such as methanol, ethanol, phenol, cyclohexanol, N-methylethanolamine, polyethylene glycol monomethyl ether, polypropylene and glycol monomethyl ether; secondary amines such as diethylamine and dicyclohexylamine; primary amines such as butylamine and cyclohexylamine; carboxylic acids such as succinic acid, benzoic acid, and cyclohexanecarboxylic acid; thiols such as ethyl mercaptan, allyl mercaptan, and thiophenol; and epoxy group-containing compounds, wherein two or more species of which may be used in combination.

Examples of the carbodiimidation catalyst usable here include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers of these compounds; and metal catalysts such as tetrabutyl titanate. Among them, 3-methyl-1-phenyl-2-phospholene-1-oxide is preferable in view of reactivity. Two or more species of the carbodiimidation catalyst may be used in combination.

The content of the carbodiimide compound, per 100 parts by mass of polyamide resin (A), is preferably 0.1 to 2 parts by mass, more preferably 0.2 to 1.5 parts by mass, and furthermore preferably 0.3 to 1.5 parts by mass. If the content is less than 0.1 parts by mass, the resin composition tends to have an insufficient level of hydrolysis resistance, tends to fluctuate discharge in the process of melt kneading by extrusion, and thereby tends to make the melt kneading insufficient. On the other hand, if the content exceeds 2 parts by mass, the viscosity of the resin composition during the melt kneading considerably increases, and thereby the melt kneading property and moldability tend to degrade.

[Carbon Fiber (B)]

Examples of the carbon fiber (B) usable in the present invention include various carbon fibers which include PAN-based carbon fiber, pitch-based carbon fiber, and rayon-based carbon fiber, wherein the existing forms of which include simple monofilament or multifilament; arrangement of them in an unidirectional or an alternately crossed manner; fabric such as knitted/woven fabric, non-woven fabric, mat and so forth.

Among them, existing forms of monofilament, fabric, non-woven fabric and mat are preferable. Also prepreg, configured by placing or stacking these material, and by allowing a binder or the like to impregnate therein, is preferably used.

The average fiber diameter of the carbon fiber (B) is preferably 1 to 100 µm, more preferably 3 to 50 µm, furthermore preferably 4 to 20 µm, and particularly 5 to 10 µm. With the average fiber diameter fallen in these ranges, the resin will be easy to process, and the resultant molded article will have good elastic modulus and strength. The average fiber diameter may be measured by observation under a scanning electron microscope (SEM) or the like. Fifty or more filaments are randomly sampled to measure the length, and the number-average fiber diameter is determined.

The carbon fiber (B) preferably has a fineness of 20 to 3,000 tex, and more preferably 50 to 2,000 tex. With the fineness adjusted in these ranges, the resin will be easy to process, and the resultant molded article will have good elastic modulus and strength. The fineness may be determined by finding the weight of filament of an arbitrary length, and by converting the value into weight per 1,000 m. The carbon fiber preferably used here generally has a number of filaments of 500 to 30,000 or around.

The carbon fiber (B) which resides in the fiber reinforced polyamide resin material of the present invention preferably has a fiber length of 0.01 mm or longer in terms of average fiber length, more preferably 0.1 mm or longer, and particularly 1 mm or larger, with the upper limit value not specifically limited.

A method of measuring the average fiber length in the fiber reinforced polyamide resin material of the present invention is not specifically limited. For example, the fiber reinforced polyamide resin material may be dissolved into hexafluoroisopropanol (HFIP) to solubilize the polyamide resin, and the length of the remained fiber may be measured visually, or optionally under an optical microscope or a scanning electron microscope (SEM). One hundred fibers are randomly sampled to measure the length, and the number-average fiber length is calculated.

While the average fiber length of a pre-use source of the carbon fiber (B) to be used is not specifically limited, it is preferably 0.01 mm or longer in view of improving the moldability, more preferably 0.1 mm or longer or around, and furthermore preferably 1 mm or larger.

[Compound (C) which is Reactive with Amino Group]

In the present invention, the carbon fiber (B) has, on the surface thereof, the compound (C) which is reactive with amino group. At least one bond may be formed between the compound (C) which is reactive with amino group and an amino group contained in the polyamide resin (A). In general, after kneading, at least parts of the compound (C) which is reactive with amino group of the polyamide resin (A) react with each other to form a bond. With such construction, the interface adhesiveness between the polyamide resin (A) and the carbon fiber (B) improves in an effective manner.

The compound (C) which is reactive with amino group is preferably exemplified by functional compounds such as epoxy compound, acrylic compound, silane compound, titanate compound, alkylene glycol compound, carboxylic acid compound, hydroxylated compound, isocyanate compound, aldehyde compound, unsaturated fatty acid, and saturated fatty acid.

The epoxy compound is exemplified by glycidyl compounds such as epoxyalkane, alkane diepoxide, bisphenol A glycidyl ether, dimer of bisphenol A-glycidyl ether, trimer of bisphenol A-glycidyl ether, oligomer of bisphenol A-glycidyl ether, polymer of bisphenol A-glycidyl ether, bisphenol F-glycidyl ether, dimer of bisphenol F-glycidyl ether, trimer of bisphenol F-glycidyl ether, oligomer of bisphenol F-glycidyl ether, polymer of bisphenol F-glycidyl ether, stearyl glycidyl ether, phenylglycidyl ether, ethylene oxide lauryl alcohol glycidyl ether, ethylene glycol diglycidyl ether, polyethylene glycoldiglycidyl ether, and propylene glycol diglycidyl ether; glycidyl ester compounds such as glycidyl benzoate, glycidyl p-toluate, glycidyl stearate, glycidyl laurate, glycidyl palmitate, glycidyl oleate, glycidyl linoleate, glycidyl linolenate, and diglycidyl phtalate; and glycidylamine compounds such as tetraglycidyl aminodiphenylmethane, triglycidyl aminophenol, diglycidyl aniline, diglycidyl toluidine, tetraglycidyl metaxylenediamine, triglycidyl cyanurate, and triglycidyl isocyanurate.

The acrylic compound is exemplified by acrylic acid, methacrylic acid, crotonic acid, acrylic ester compound, methacrylic ester compound, and crotonic ester compound.

The silane compound is exemplified by trialkoxy or triaryloxy silane compounds such as aminopropyl triethoxysilane, phenylaminopropyl trimethoxysilane, glycidylpropyl triethoxysilane, methacryloxypropyl trimethoxysilane, vinyl triethoxysilane; ureido silane, sulfide silane, vinylsilane, and imidazole silane.

The titanate compound is exemplified by tetraisopropyl titanate, tetranormalbutyl titanate, butyl titanate dimer, tetraoctyl titanate, titanium acetylacetonate, titanium tetraacetyl acetonate, titanium ethylacetoacetate, titanium phosphate compound, titanium octylene glycolate, titanium ethyl acetoacetate, titanium lactate ammonium salt, titanium lactate, titanium lactate, and titanium triethanolaminate.

The alkylene glycol compound is exemplified by ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, and polytetramethylene glycol.

The carboxylic acid compound is exemplified by acrylic acid, methacrylic acid, crotonic acid, acrylic ester compound, methacrylic ester compound, and crotonic ester compound.

The hydroxylated compound is exemplified by bisphenol A, hydrogenated bisphenol A, bisphenol F, and hydrogenated bisphenol F.

Also epoxy resins such as bisphenol A-type epoxy resin; and vinyl ester-based resins, which are epoxy acrylate resins having an acryl group or a methacryl group in one molecule, such as bisphenol A-type vinyl ester resin, novolac-type vinyl ester resin, and brominated vinyl ester resin are preferably used. Urethane-modified resins of epoxy-based resin and vinyl ester-based resin are also usable.

The isocyanate compound is preferably exemplified by tolylene diisocyanate, phenylene diisocyanate, diphenylmethane diisocyanate, naphthalene diisocyanate, tetrahydronaphthalene diisocyanate, tetramethylene diisocyanate, hexamethylene diisocyanate, dodecamethylene diisocyanate, trimethylhexamethylene diisocyanate, cyclohexylene diisocyanate, xylylene diisocyanate, and isophorone diisocyanate.

The aldehyde compound is preferably exemplified by formaldehyde, acetaldehyde, propionaldehyde, isobutylaldehyde, n-butylaldehyde, crotonaldehyde, acrolein, methacrolein, benzaldehyde, salicylaldehyde, isovaleraldehyde, n-valeraldehyde, cinnamaldehyde, o-tolualdehyde, glutaraldehyde, m-tolualdehyde, and p-tolualdehyde.

The unsaturated fatty acid is preferably exemplified by crotonic acid, myristoleic acid, palmitoleic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, eleostearic acid, mead acid, and eicosatrienoic acid.

The saturated fatty acid is preferably exemplified by butanoic acid, pentanoic acid, hexanoic acid, heptanoic acid, octanoic acid, nonanoic acid, decanoic acid, dodecanoic acid, tetradecanoic acid, pentadecanoic acid, hexadecanoic acid, heptadecanoic acid, and octadecanoic acid.

Particularly preferable examples of the compound (C) which is reactive with amino group include bisphenol A-glycidyl ether, bisphenol F-glycidyl ether, and tolylene diisocyanate. Also dicyanate adduct of bisphenol A, and diglycidyl ether of oxide adduct of bisphenol F are preferable.

The compound (C) is typically applied (used for treatment) over the surface of the carbon fiber by the methods below. The methods of application are selectable from those publicly known, such as a method of coating the compound (C) over the carbon fiber; and a method of dipping the carbon fiber into a solution containing the compound (C). In an exemplary method, the carbon fiber is cleaned by sonication in an acetone or chloroform solution, the cleaned fiber is passed through a solution containing the compound (C), and wound up. The solvent for dissolving the compound (C) is selectable from low-molecular-weight ether compounds or ester compounds. The compound (C) may be applied to calcined carbon fiber, or to fiber before being made into roving, in the process of manufacturing the carbon fiber.

The amount of use of the compound (C) for the treatment (C), relative to the carbon fiber (B), is preferably 5% by mass or less, more preferably 4% by mass or less, and furthermore preferably 3% by mass or less. The lower limit of the amount of use is preferably 0.1% by mass or above, more preferably 0.3% by mass or above, and particularly 0.5% by mass or above.

In the present invention, the amount of use of the compound (C) for treatment, relative to the carbon fiber (B), is preferably 1.5% by mass or less. According to the present invention, by carrying press molding within a short time, it is now possible to achieve high interfacial shear strength between the polyamide resin (A) and the carbon fiber (B), and, to achieve high bending strength of the molded article, even with such small amount of use of the compound (C). In particular, by using the polyamide resin characterized by its short semi-crystallization time, the interfacial shear strength may be improved, and thereby the bending strength of the molded article may be enhanced even if press-molded within a short time.

For the press molding within a short time, the content of the compound (C), relative to the carbon fiber (B), is preferably 1.2% by mass or less, more preferably 1.0% by mass or less, furthermore preferably 0.8% by mass or less, and particularly 0.5% by mass or less. The lower limit of the amount of mixing of the compound (C) is preferably 0.01% by mass or above, more preferably 0.03% by mass or above, furthermore preferably 0.06% by mass or above, and particularly 0.10% by mass or above. In the present invention, it is particularly preferable that the total amount of the compound (C) over the surface of the carbon fiber (B) falls within the reactive functional group concentration of the polyamide resin (A).

Note that the press molding within a short time in this context means press molding within 1 to 10 minutes, and preferably 1 to 6 minutes. The temperature of press molding in this context is preferably 215 to 300° C., and more preferably 220 to 270° C. The pressure of press molding is preferably 0.1 to 5 MPa, and more preferably 1 to 4 MPa.

In the press molding within a short time in the present invention, the polyamide resin (A) (or a composition containing the polyamide resin and a nucleating agent) preferably shows a semi-crystallization time, measured under the conditions below, of 1 to 30 seconds, more preferably 1 to 20 seconds, furthermore preferably 1 to 10 seconds, and particularly 1 to 5 seconds. By using the polyamide resin (A) showing such semi-crystallization time, the interfacial shear with respect to the carbon fiber (B) is now more likely to improve. It is particular effective to use the polyamide resin showing such short semi-crystallization time, in the press molding within a short time as described later. Methods of adjusting the semi-crystallization time within the above-described ranges include adjusting various characteristics of the polyamide resin as described above, and mixing the nucleating agent.

The semi-crystallization time of the polyamide resin (A) (for the case with the nucleating agent, a composition containing the polyamide resin and the nucleating agent) is measured using a crystallization rate measuring instrument (Model MK-801) from Kotaki Seisakusho Co., Ltd. The polyamide resin (A) is preheated at 260° C. for 3 minutes, and immersed in an oil bath at a predetermined temperature. The polarization compensation voltage is measured with respect to time, and the time at which the voltage reached half of the plateau voltage is determined as the semi-crystallization time.

[Interfacial Shear Strength]

In the fiber reinforced polyamide resin material of the present invention, the interfacial shear strength between the polyamide resin (A) and the carbon fiber (B), measured by the micro-droplet method, is preferably 35 MPa or larger, more preferably 40 MPa or larger, furthermore preferably 50 MPa or larger, particularly 60 MPa or larger, and most preferably 70 MPa or larger.

The larger the interfacial shear strength, the stronger the adhesion with the resin, thereby a high-strength composite material may be obtained.

The interfacial shear strength is measured by the micro-droplet method. Measurement of the interfacial shear strength by the micro-droplet method may be in accordance with any of publicly-known methods, and may be measured specifically by the method described in Example.

[Manufacture of Fiber Reinforced Polyamide Resin Material]

Methods of manufacturing the fiber reinforced polyamide resin material of the present invention are not specifically limited, wherein it is preferable to knead the individual components by a kneading method using a uniaxial extruder, biaxial extruder, roll kneader, or Brabender mixer. That is, one example of preferable embodiments of the fiber reinforced polyamide resin material of the present invention relates to a fiber reinforced polyamide resin material, which is specifically a material (pellet, for example) configured by kneading the polyamide resin (A), the carbon fiber (B), and adhered thereon the compound (C) which is reactive with amino group.

In the kneading, it is also effective to use a static mixer or dynamic mixer in combination. For the purpose of improving the state of kneading, use of a biaxial extruder is particularly preferable.

As for the kneading temperature, inlet temperature (Tin) and outlet temperature (Tout) of the cylinder preferably satisfy the relational formula below:

$$Tout \geq Tin+20° C.$$

It is also preferable that the inlet temperature (Tin) and the outlet temperature (Tout) of the cylinder, and the melting point of the polyamide resin (A) (Tm) satisfy the relational formulae (1) and (2) below:

$$Tm+60° C. \geq Tout \geq Tm+10° C. \qquad (1)$$

$$Tm+40° C. \geq Tin \geq Tm-50° C. \qquad (2)$$

By defining the inlet temperature (Tin) and the outlet temperature (Tout) of the cylinder as described above, it is supposed that a crystal kernel which serves as an initiation point of crystallization is allowed to exist in a molten resin to an appropriate degree without excessively melting the resin, which accelerates the crystallization, and facilitates control of the crystallinity of the molded article.

As for the method of feeding the ingredients, the polyamide resin (A), the carbon fiber (B), and other optional ingredients may be mixed collectively in a dry state, or each ingredient may be melt and kneaded using an independent feeder.

The method of feeding the carbon fiber (B) is preferably based on side feeding in the middle way of the extruder. The carbon fiber (B) is preliminarily treated with the compound (C) which is reactive with amino group, so as to have over the surface thereof a film of the compound (C). For the side feeding, it is preferable to use the carbon fiber (B) preliminarily cut into is 1 to 5 mm length.

After kneaded, the resin is extruded in the form of strand, cooled typically by water cooling, and pelletized. Alternatively, the molten resin kneaded in the extruder may be made directly into sheet, film, profile-extruded product, blow-molded article and injection-molded article, while skipping the pelletization.

The thus obtained fiber reinforced polyamide resin materials may be made into various molded article by injection molding, blow molding, extrusion molding, and, by molding methods after sheet forming such as vacuum forming, pressure forming, and vacuum/pressure forming. Among them, preferable is injection molding, including not only general injection molding, or also gas-assisted injection molding, and injection press molding.

The fiber reinforced polyamide resin material, having the carbon fiber unidirectionally aligned therein, is obtainable typically by compressing, at 1 MPa, a sheety article of opened carbon fiber and a polyamide resin film, using a plurality of rolls under heating in the temperature range 10 to 30° C. higher than Tm of the polyamide resin for continuous lamination, cooling the laminate on a roll at 40° C., and then winding up the laminate to form a roll. The rolls used here for compression under heating are preferably coated over the surface thereof with a fluorine-containing resin.

When the content of the carbon fiber, in the fiber reinforced polyamide resin material having the carbon fiber unidirectionally aligned therein, needs to be altered, thickening of the film in the process of manufacturing the polyamide resin film using a uniaxial extruder with a T-die will reduce the content of carbon fiber in the resultant fiber reinforced polyamide resin material, meanwhile thinning of the film will increase the content of carbon fiber in the resultant fiber reinforced polyamide resin material, without modifying the lamination process of the carbon fiber.

EXAMPLE

The present invention will be further detailed below, referring to Examples and Comparative Examples, by which the present invention is by no means limited.

The individual processes of measurement and evaluation were conducted as below.

[Terminal Amino Group Concentration ($[NH_2]$)]

In 30 ml of a phenol/methanol (4:1) mixed solution, 0.5 g of polyamide resin precisely weighed was dissolved under stirring at 20 to 30° C. to complete dissolution, and the solution was neutralized by titration with a 0.01 N hydrochloric acid solution, to determine the concentration.

[Terminal Carboxy Group Concentration ([COOH])]

In 30 ml of benzyl alcohol, 0.1 g of polyamide resin precisely weighed was dissolved under stirring under nitrogen gas flow, at 200° C. for approximately 15 minutes to complete dissolution, the solution was cooled under nitrogen gas flow down to 165° C., and 0.1 ml of phenol red solution was added under stirring. The solution was kept at 160 to 165° C., and then titrated with a titrating solution prepared by dissolving 0.132 g of KOH into 200 ml of benzyl alcohol (0.01 mol KOH/l), and the concentration was determined at the point where the color of solution turned from yellow to red, and remained in red.

[Terminal Amino Group Concentration/Terminal Carboxy Group Concentration ($[NH_2]/[COOH]$)]

The value was calculated using both concentration values described above.

[Number-Average Molecular Weight]

The value was calculated according to the equation below, using values of the terminal amino group concentration $[NH_2]$ (μeq/g) and the terminal carboxy group concentration [COOH] (μeq/g) of the polyamide resin determined above by the neutralization titration.

$$\text{Number-average molecular weight}=2\times1,000,000/([COOH]+[NH_2])$$

[Mole Ratio of Reaction]

Mole ratio of reaction was determined according to the equation below:

$$r=(1-cN-b(C-N))/(1-cC+a(C-N))$$

where,
a: M1/2
b: M2/2
c: 18.015
M1: molecular weight of diamine (g/mol)
M2: molecular weight of dicarboxylic acid (g/mol)
N: amino group concentration (equivalent/g)
C: carboxy group concentration (equivalent/g)

[Interfacial Shear Strength (Micro-Droplet Method) (in MPa)]

The interfacial shear strength between the polyamide resin (A) and the carbon fiber (B) was measured as described below, according to the micro-droplet method.

Molten polyamide resin (A) was adhered onto a single string of carbon fiber in a spherical form, to obtain a test sample. The resin was thoroughly cooled at 23° C., 55% RH, the solidified resin ball was pinched, the carbon fiber was then pulled in the axial direction thereof away from the resin ball to measure the maximum load required for pullout, and the interfacial shear strength was calculated according to the equation below. Ten test samples were measured to determine an average value.

Interfacial shear strength (MPa)=9.8×Pullout load (kg)/fiber diameter (mm)×Π×diameter of resin ball

[Strength (in MPa)]

Using the individual test pieces manufactured in Examples and Comparative Examples, bending strength was measured in accordance with ISO179. The test pieces for measurement of bending were 80 mm×10 mm×4 mm in size for the injection-molded article, and 80 mm×20 mm×1 mm in size for the press-molded article.

[Rate of Impregnation]

Cross section in the thickness direction of the molded article was observed and measured as described below. The molded article was polished at the end, the molded article was embedded with an epoxy resin, polished on the surface thereof at the end of the cross section, and a portion of the molded article, the area ranging over the thickness of molded article and 500 μm in width, was photographed under a ultradeep color 3D profile microscope VK-9500 (controller unit)/VK-9510 (measurement unit) (from Keyence Corporation) at a 400× magnification. On the captured image, areas of a region impregnated with resin and a region not impregnated with resin were determined, and the rate of impregnation was calculated according to the equation below:

Rate of impregnation (%)=100×(Total area with impregnated resin)/(Observed cross sectional area of molded article).

[Semi-Crystallization Time (in Sec)]

Semi-crystallization time of polyamide resin, or composition composed of polyamide resin and a nucleating agent was measured using a crystallization rate measuring instrument (Model MK-801) from Kotaki Seisakusho Co., Ltd. The samples were preheated at 260° C. for 3 minutes, and then immersed in an oil bath at a predetermined temperature. Polarization compensation voltage was measured with respect to the exposure time, and the time at which the voltage reached half of the plateau voltage was determined as the semi-crystallization time.

<Exemplary Manufacture of Polyamide Resin 1>

In a reaction vessel equipped with a stirrer, a partial condenser, a total condenser, a thermometer, a dropping funnel, a nitrogen feeding pipe, and a strand die, 12,135 g (60 mol) of sebacic acid derived from castor bean, 3.105 g of sodium hydrophosphite monohydrate (NaH$_2$PO$_2$.H$_2$O) (equivalent to 50 ppm of phosphorus atom in polyamide resin), and 1.61 g of sodium acetate, all of which were precisely weighed, were placed, the vessel was fully replaced with nitrogen, and then filled with nitrogen up to an inner pressure of 0.4 MPa, and the content was heated to 170° C. under stirring and under a small volume of nitrogen gas flow. The mole ratio of sodium hydrophosphite monohydrate/sodium acetate was set to 0.67.

To the mixture, 8,335 g (61 mol) of a 7:3 (mole ratio) mixed diamine of meta-xylylenediamine and para-xylylenediamine was added dropwise under stirring, and the system was continuously heated while eliminating water produced as a result of condensation out of the system. After completion of the dropwise addition of the mixed xylylenediamine, the inner temperature was kept at 260° C. to allow the melt polymerization reaction to proceed for 20 minutes. The inner pressure was then returned back to the atmospheric pressure at a rate of 0.01 MPa/min.

The system was again pressurized with nitrogen, and the polymer was drawn out from the strand die and pelletized, to obtain approximately 24 kg of polyamide resin (A-1). The obtained pellet was dried with dehumidification air at 80° C. (dew point=−40° C.) for one hour.

Values of the terminal group concentration of the polyamide resin (A-1) were as listed in Table 1.

<Exemplary Manufacture of Polyamide Resin 2>

Polyamide resin (A-2) was manufactured in the same way as in Exemplary Manufacture 1, except that para-xylylenediamine was used as the source diamine, and the inner temperature after completion of the dropwise addition of diamine was set to 290° C.

Values of the terminal group concentration of the polyamide resin (A-2) were as listed in Table 1.

<Exemplary Manufacture of Polyamide Resin 3>

In a reaction vessel equipped with a stirrer, a partial condenser, a total condenser, a thermometer, a dropping funnel, a nitrogen feeding pipe, and a strand die, 12,135 g (60 mol) of sebacic acid derived from castor bean, 3.105 g of sodium hydrophosphite monohydrate (NaH$_2$PO$_2$.H$_2$O) (equivalent to 50 ppm of phosphorus atom in polyamide resin), and 1.61 g of sodium acetate, all of which were precisely weighed, were placed, the vessel was fully replaced with nitrogen, and the system was heated to 170° C. under stirring and under a small volume of nitrogen gas flow. The mole ratio of sodium hydrophosphite monohydrate/sodium acetate was set to 0.67.

To the mixture, 8,172 g (60 mol) of a 7:3 (mole ratio) mixed diamine of meta-xylylenediamine and para-xylylenediamine was added dropwise under stirring, and the system was continuously heated while eliminating water produced as a result of condensation out of the system. After completion of the dropwise addition of the mixed xylylenediamine, the inner temperature was kept at 260° C. to allow the melt polymerization reaction to proceed for 20 minutes.

The system was then pressurized with nitrogen, and the polymer was drawn out from the strand die and pelletized, to obtain approximately 24 kg of polyamide resin (A-3). The obtained pellet was dried with dehumidification air at 80° C. (dew point=−40° C.) for one hour.

Values of the terminal group concentration of the polyamide resin (A-3) were as listed in Table 1.

<Exemplary Manufacture of Polyamide Resin 4>

Polyamide resin (A-4) was manufactured in the same way as in Exemplary Manufacture 3, except that para-xylylenediamine was used in place of the mixed diamine.

Values of the terminal group concentration of the polyamide resin (A-4) were as listed in Table 1.

<Exemplary Manufacture of Polyamide Resin 5>

Polyamide resin (A-5) was manufactured in the same way as in Exemplary Manufacture 1, except that 8,335 g (61 mol) of a 15:85 (mole ratio) mixed diamine of meta-xylylenediamine and para-xylylenediamine was used as the source diamine, and the inner temperature after completion of the dropwise addition of diamine was set to 270° C.

Values of the terminal group concentration of the polyamide resin (A-5) and the rate of semi-crystallization were as listed in Table 3.

<Exemplary Manufacture of Polyamide Resin 6>

Polyamide resin (A-6) was manufactured in the same way as in Exemplary Manufacture 1, except that 8,335 g (61 mol) of a 30:70 (mole ratio) mixed diamine of meta-xylylenediamine and para-xylylenediamine was used as the source diamine, and the inner temperature after completion of the dropwise addition of diamine was set to 270° C.

Values of the terminal group concentration of the polyamide resin (A-6) and the rate of semi-crystallization were as listed in Table 3.

<Exemplary Manufacture of Polyamide Resin 7>

Polyamide resin (A-7) was manufactured in the same way as in Exemplary Manufacture 1, except that 8,335 g (61 mol) of a 45:55 (mole ratio) mixed diamine of meta-xylylenediamine and para-xylylenediamine was used as the source diamine, and the inner temperature after completion of the dropwise addition of diamine was set to 270° C.

Values of the terminal group concentration of the polyamide resin (A-7) and the rate of semi-crystallization were as listed in Table 3.

<Exemplary Manufacture of Polyamide Resin 8>

Polyamide resin (A-8) was manufactured in the same way as in Exemplary Manufacture 1, except that 8,335 g (61 mol) of a 60:40 (mole ratio) mixed diamine of meta-xylylenediamine and para-xylylenediamine was used as the source diamine, and the inner temperature after completion of the dropwise addition of diamine was set to 260° C.

Values of the terminal group concentration of the polyamide resin (A-8) and the rate of semi-crystallization were as listed in Table 3.

<Preparation of Surface-Treated Carbon Fiber>

<<B-1>>

Carbon fiber (PYROFIL, from Mitsubishi Rayon Co., Ltd.) was immersed into chloroform, and cleaned by sonication for 30 minutes. The cleaned carbon fiber was isolated, and dried at 60° C. for 3 hours. Next, the carbon fiber was dipped in a methyl ethyl ketone solution containing 10% by mass of bisphenol A glycidyl ether (DGEBA), and then blown with air at 23° C. for 10 minutes, to thereby obtain carbon fiber (B-1). The amount of compound C, listed in Table described later, is given in % by mass relative to the carbon fiber (the same will apply hereinafter).

<<B-2>>

Carbon fiber (B-2) was obtained in the same way as in B-1, except that 10% by mass of tolylene diisocyanate (TDI) was further added.

<<B-3>>

Carbon fiber (B-3) was obtained in the same way as in B-2, except that, besides 10% by mass of DGEBA, 10% by mass of TDI and 2% by mass of bisphenol F-glycidyl ether (DGEBF) were further added.

<<B-4>>

Carbon fiber (PYROFIL, from Mitsubishi Rayon Co., Ltd.) was immersed into chloroform, and cleaned by sonication for 30 minutes. The cleaned carbon fiber was isolated, and dried at 60° C. for 3 hours. Next, the carbon fiber was dipped in a methyl ethyl ketone solution containing 5% by mass of bisphenol A glycidyl ether (DGEBA), and then blown with air at 23° C. for 10 minutes, to thereby obtain carbon fiber (B-4).

<<B-5>>

Carbon fiber (B-5) was obtained in the same way as in B-4, except that the amount of use of DGEBA was changed to 15% by mass.

<<B-6>>

Carbon fiber (B-6) was obtained in the same was as in B-4, except that the amount of use of DGEBA was changed to 20% by mass.

<<B-7>>

Carbon fiber (B-7) was obtained in the same way as in B-4, except that the amount of use of DGEBA was changed to 1% by mass.

<<B-8>>

Carbon fiber (B-8) was obtained in the same way as in B-4, except that 5% by mass of bisphenol A dicyanate ester (DCEBA) was added, without adding DGEBA.

<<B-9>>

Carbon fiber (B-9) was obtained in the same way as in B-4, except that 5% by mass of bisphenol F propylene oxide adduct diglycidyl ether (PODGEBF) was added, without adding DGEBA.

<<B-10>>

Carbon fiber (B-10) was obtained in the same way as in B-4, except that the amount of use of DGEBA was changed to 25% by mass.

Method of measuring the amount of treatment with the surface treatment agent on the carbon fiber will be described below. First, a proper amount of the treated carbon fiber was cut, and the mass (X) was measured. The measured carbon fiber was immersed into methyl ethyl ketone to solubilize the surface treatment agent. Methyl ethyl ketone was then evaporated, the residue was collected, and the mass (Y) was measured. The amount of surface treatment agent was calculated as Y/X (wt %).

Example 1

<Manufacture of Fiber Reinforced Polyamide Resin Material for Injection Molding>

One hundred parts by mass of the pelletized polyamide resin (A-1) obtained above was loaded on a biaxial extruder ("TEM26SS", from Toshiba Machine Co., Ltd.) through the base portion thereof, allowed to melt, and 150 parts by mass of carbon fiber (B-1) was fed from the side portion. While setting the temperature of the extruder to 230° C. up to the side feeder unit, and to 215° C. beyond the side feeder unit, the resin was extruded and pelletized, to thereby obtain a pellet of the fiber reinforced polyamide resin material.

The obtained pellet of the fiber reinforced polyamide resin material was dried with dehumidification air at 80° C. (dew point=−40° C.) for 8 hours. Using an injection molding machine "100T" from FANUC Corporation, with a cylinder temperature of 215 to 280° C., and a die temperature of 120° C., the dried fiber reinforced polyamide resin material was molded to give a test piece for bending test. Bending strength was measured using the obtained injection-molded test piece. Results are shown in Table 1.

<Manufacture of Fiber Reinforced Polyamide Resin Material for Press Molding>

The pellet of the polyamide resin (A−1) obtained above was fed into an uniaxial extruder (PTM-30, from Research Laboratory of Plastics Technology Co., Ltd.) with T-die, having a cylinder of 30 mm in diameter. The pellet was melt and kneaded at a cylinder temperature of 215° C. to 260° C., and a number of rotation of screw of 30 rpm, then extruded through the T-die, solidified on a cooling roll, to thereby obtain a film of 50 μm thick. The obtained polyamide resin film and an opened sheety carbon fiber (B-1) were continuously laminated through two pairs of pressure rolls (pressurized at 1 MPa) heated at 225° C., cooled on a roll at 40° C., and wound into a roll. A film of fiber reinforced polyamide resin material was thus manufactured.

The obtained film of fiber reinforced polyamide resin material was unidirectionally stacked, and pressed under heating at 280° C., 4 MPa for one hour, to obtain a molded article. Test pieces to be subjected to the bending test were cut out from the obtained molded article using a water jet cutter, and bending strength was measured. Results of evaluation are listed in Table 1.

Example 2

A fiber reinforced polyamide resin material was manufactured in the same way as in Example 1, except that the carbon fiber (B-2) was used as the carbon fiber (B). Results of evaluation are listed in Table 1.

Example 3

A fiber reinforced polyamide resin material was manufactured in the same way as in Example 1, except that the carbon fiber (B-3) was used as the carbon fiber (B). Results of evaluation are listed in Table 1.

Example 4

The polyamide resin (A-2) obtained in Exemplary Manufacture 2 described above was used as the polyamide resin (A).

<Manufacture of Fiber Reinforced Polyamide Resin Material for Injection Molding>

A pellet of the fiber reinforced polyamide resin material was manufactured and evaluated in the same way as in Example 1, except that the preset temperature of the extruder was set to 300° C., and the temperature of the side feeder unit was set to 290° C.

<Manufacture of Fiber Reinforced Polyamide Resin Material for Press Molding>

A film of the fiber reinforced polyamide resin material was manufactured and evaluated in the same way as in Example 1, except that the cylinder temperature of the uniaxial extruder with T-die was set to 280 to 300° C.

Results of evaluation are listed in Table 1.

Example 5

A fiber reinforced polyamide resin material was manufactured and evaluated in the same way as in Example 4, except that the carbon fiber (B-2) was used as the carbon fiber (B). Results of evaluation are listed in Table 1.

Example 6

A fiber reinforced polyamide resin material was manufactured and evaluated in the same way as in Example 4, except that the carbon fiber (B-3) was used as the carbon fiber (B). Results of evaluation are listed in Table 1.

Example 7

A fiber reinforced polyamide resin material was manufactured and evaluated in the same way as in Example 1, except that the polyamide resin (A-3) obtained above was used. Results of evaluation are listed in Table 1.

Example 8

A fiber reinforced polyamide resin material was manufactured and evaluated in the same way as in Example 4, except that the polyamide resin (A-4) obtained above was used. Results of evaluation are listed in Table 1.

Comparative Example 1

A pellet of the fiber reinforced polyamide resin material was manufactured and evaluated in the same way as in Example 1, except that carbon fiber (N-1), obtained by immersing the carbon fiber in chloroform, cleaned by sonication for 30 minutes, and dried at 60° C. for 3 hours, was used in place of the carbon fiber (B-1). Results of evaluation are listed in Table 1.

Comparative Example 2

A pellet of the fiber reinforced polyamide resin material was manufactured and evaluated in the same way as in Example 4, except that carbon fiber (N-1), obtained by immersing the carbon fiber in chloroform, cleaned by sonication for 30 minutes, and dried at 60° C. for 3 hours, was used in place of the carbon fiber (B-1). Results of evaluation are listed in Table 1.

Example 11

<Manufacture of Fiber Reinforced Polyamide Resin Material>

A pellet of the polyamide resin (A-2) obtained above was fed into an uniaxial extruder (PTM-30, from Research Laboratory of Plastics Technology Co., Ltd.) with T-die, having a cylinder of 30 mm in diameter. The pellet was melt and kneaded at a cylinder temperature of 300° C., and a number of rotation of screw of 30 rpm, then extruded through the T-die, solidified on a cooling roll, to thereby obtain a film of 50 μm thick. The obtained polyamide resin film and an opened sheety carbon fiber (B-4) were continuously laminated through two pairs of pressure rolls (pressurized at 1 MPa) heated at 300° C., cooled on a roll at 40° C., and wound into a roll. A film of fiber reinforced polyamide resin material was thus manufactured.

The obtained film of fiber reinforced polyamide resin material was unidirectionally stacked, and pressed under heating at 280° C., 4 MPa for 3 minutes, to obtain a molded article. Test pieces to be subjected to the bending test were cut out from the obtained molded article using a water jet cutter, and bending strength was measured. Results of evaluation are listed in Table 2.

Example 12

A fiber reinforced polyamide resin material was manufactured and evaluated in the same way as in Example 11, except that the carbon fiber (B-5) was used as the carbon fiber (B). Results of evaluation are listed in Table 2.

Example 13

A fiber reinforced polyamide resin material was manufactured and evaluated in the same way as in Example 11, except that the carbon fiber (B-6) was used as the carbon fiber (B). Results of evaluation are listed in Table 2.

Example 14

A fiber reinforced polyamide resin material was manufactured and evaluated in the same way as in Example 11, except that the carbon fiber (B-7) was used as the carbon fiber (B). Results of evaluation are listed in Table 2.

Example 15

A fiber reinforced polyamide resin material was manufactured and evaluated in the same way as in Example 11, except that the carbon fiber (B-8) was used as the carbon fiber (B). Results of evaluation are listed in Table 2.

Example 16

A fiber reinforced polyamide resin material was manufactured and evaluated in the same way as in Example 11, except that the carbon fiber (B-9) was used as the carbon fiber (B). Results of evaluation are listed in Table 2.

Example 17

A fiber reinforced polyamide resin material was manufactured and evaluated in the same way as in Example 11, except that the polyamide resin (A-4) obtained in Exemplary Manufacture 4 described above was used as the polyamide resin (A). Results of evaluation are listed in Table 2.

Example 18

A fiber reinforced polyamide resin material was manufactured and evaluated in the same way as in Example 11, except that the polyamide resin (A-5) obtained in Exemplary Manufacture 5 described above was used as the polyamide resin (A), and the cylinder temperature and roll temperature were set to 290° C. Results of evaluation are listed in Table 3.

Example 19

A fiber reinforced polyamide resin material was manufactured and evaluated in the same way as in Example 11, except that the polyamide resin (A-6) obtained in Exemplary Manufacture 6 described above was used as the polyamide resin (A), and the cylinder temperature and roll temperature were set to 280° C. Results of evaluation are listed in Table 3.

Example 20

A fiber reinforced polyamide resin material was manufactured and evaluated in the same way as in Example 11, except that the polyamide resin (A-7) obtained in Exemplary Manufacture 7 described above was used as the polyamide resin (A), and the cylinder temperature and roll temperature were set to 270° C. Results of evaluation are listed in Table 3.

Example 21

A fiber reinforced polyamide resin material was manufactured and evaluated in the same way as in Example 11, except that the polyamide resin (A-8) obtained in Exemplary Manufacture 8 described above was used as the polyamide resin (A), and the cylinder temperature and roll temperature were set to 260° C. Results of evaluation are listed in Table 3.

Example 22

A fiber reinforced polyamide resin material was manufactured and evaluated in the same way as in Example 11, except that the polyamide resin (A-1) obtained in Exemplary Manufacture 1 described above was used as the polyamide resin (A), and the cylinder temperature and roll temperature were set to 250° C. Results of evaluation are listed in Table 3.

Example 23

A fiber reinforced polyamide resin material was manufactured and evaluated in the same way as in Example 11, except that the carbon fiber (B-10) was used as the carbon fiber (B). Results of evaluation are listed in Table 3.

Comparative Example 11

A fiber reinforced polyamide resin material was manufactured and evaluated in the same way as in Example 11, except that the carbon fiber (N-1) was used as the carbon fiber (B). Results of evaluation are listed in Table 3.

TABLE 1

| | | | Example | | | | |
|---|---|---|---|---|---|---|---|
| | | | 1 | 2 | 3 | 4 | 5 |
| Polyamide resin | | | A-1 | A-1 | A-1 | A-2 | A-2 |
| Diamine | MXDA | | 70 | 70 | 70 | 0 | 0 |
| (mol %) | PXDA | | 30 | 30 | 30 | 100 | 100 |
| Dicarboxylic acid | Sebacic acid | | 100 | 100 | 100 | 100 | 100 |
| Terminal amino group concentration ($[NH_2]$) | µeq/g | | 89 | 89 | 89 | 90 | 90 |
| Terminal carboxy group concentration ($[COOH]$) | µeq/g | | 37 | 37 | 37 | 39 | 39 |
| $[NH_2]/[COOH]$ | | | 2.41 | 2.41 | 2.41 | 2.31 | 2.31 |
| Mole ratio of reaction | | | 1.008 | 1.008 | 1.008 | 1.008 | 1.008 |
| Carbon fiber | | | B-1 | B-2 | B-3 | B-1 | B-2 |
| Surface treatment agent for carbon fiber (Compound C) | | | DGEBA TDI | DGEBA TDI | DGEBA DGEBF | DGEBA TDI | DGEBA |
| Amount of Compound C | % by mass | | 0.5 | 1.1 | 1.4 | 0.5 | 1.1 |
| Interfacial shear strength | MPa | | 55 | 57 | 76 | 59 | 61 |
| Flexural strength MPa | Injection molding | | 450 | 460 | 500 | 450 | 470 |
| | Press molding | | 2420 | 2500 | 2610 | 2550 | 2570 |

TABLE 1-continued

|  |  | Example | | | Comparative Example | |
|---|---|---|---|---|---|---|
|  |  | 6 | 7 | 8 | 1 | 2 |
| Polyamide resin |  | A-2 | A-3 | A-4 | A-1 | A-2 |
| Diamine MXDA | (mol %) | 0 | 70 | 0 | 70 | 0 |
| PXDA |  | 100 | 30 | 100 | 30 | 100 |
| Dicarboxylic acid | Sebacic acid | 100 | 100 | 100 | 100 | 100 |
| Terminal amino group concentration ([NH$_2$]) | µeq/g | 90 | 40 | 26 | 89 | 90 |
| Terminal carboxy group concentration ([COOH]) | µeq/g | 39 | 53 | 110 | 37 | 39 |
| [NH$_2$]/[COOH] |  | 2.31 | 0.75 | 0.24 | 2.41 | 2.31 |
| Mole ratio of reaction |  | 1.008 | 0.998 | 0.987 | 1.008 | 1.008 |
| Carbon fiber |  | B-3 | B-1 | B-1 | N-1 | N-1 |
| Surface treatment agent for carbon fiber (Compound C) |  | DGEBA TDI DGEBF | DGEBA | DGEBA | Absent | Absent |
| Amount of Compound C | % by mass | 1.4 | 0.5 | 0.5 | — | — |
| Interfacial shear strength | MPa | 59 | 33 | 39 | 5 | 7 |
| Flexural strength | MPa Injection molding | 490 | 400 | 400 | 190 | 200 |
|  | Press molding | 2580 | 2210 | 2290 | 840 | 1230 |

TABLE 2

|  |  | Example | | | | | | |
|---|---|---|---|---|---|---|---|---|
|  |  | 11 | 12 | 13 | 14 | 15 | 16 | 17 |
| Polyamide resin |  | A-2 | A-2 | A-2 | A-2 | A-2 | A-2 | A-4 |
| Diamine MXDA | (mol %) | 0 | 0 | 0 | 0 | 0 | 0 | 0 |
| PXDA |  | 100 | 100 | 100 | 100 | 100 | 100 | 100 |
| Terminal amino group concentration ([NH$_2$]) | µeq/g | 90 | 90 | 90 | 90 | 90 | 90 | 26 |
| Terminal carboxy group concentration ([COOH]) | µeq/g | 39 | 39 | 39 | 39 | 39 | 39 | 110 |
| [NH$_2$]/[COOH] |  | 2.31 | 2.31 | 2.31 | 2.31 | 2.31 | 2.31 | 0.24 |
| Mole ratio of reaction |  | 1.008 | 1.008 | 1.008 | 1.008 | 1.008 | 1.008 | 0.987 |
| Rate of semi-crystallization (140° C.) | sec | 3 | 3 | 3 | 3 | 3 | 3 | 3 |
| Carbon fiber |  | B-4 | B-5 | B-6 | B-7 | B-8 | B-9 | B-4 |
| Surface treatment agent for carbon fiber (Compound C) |  | DGEBA | DGEBA | DGEBA | DGEBA | DCEBA | PODGEBF | DGEBA |
| Amount of Compound C | % by mass | 0.3 | 0.9 | 1.2 | 0.1 | 0.3 | 0.3 | 0.3 |
| Rate of Impregnation | % | 95 | 90 | 80 | 95 | 95 | 95 | 95 |
| Interfacial shear strength | MPa | 59 | 61 | 61 | 45 | 50 | 58 | 39 |
| Flexural strength (Press molding for 3 min) | MPa | 2550 | 2540 | 2150 | 2370 | 2480 | 2530 | 2290 |

TABLE 3

|  |  | Example | | | | | | Comparative Example |
|---|---|---|---|---|---|---|---|---|
|  |  | 18 | 19 | 20 | 21 | 22 | 23 | 11 |
| Polyamide resin |  | A-5 | A-6 | A-7 | A-8 | A-1 | A-2 | A-2 |
| Diamine MXDA | (mol %) | 15 | 30 | 45 | 60 | 70 | 0 | 0 |
| PXDA |  | 85 | 70 | 55 | 40 | 30 | 100 | 100 |
| Terminal amino group concentration ([NH$_2$]) | µeq/g | 99 | 97 | 93 | 82 | 89 | 90 | 90 |
| Terminal carboxy group concentration ([COOH]) | µeq/g | 35 | 40 | 46 | 31 | 37 | 39 | 39 |
| [NH$_2$]/[COOH] |  | 2.83 | 2.43 | 2.02 | 2.65 | 2.41 | 2.31 | 2.31 |
| Mole ratio of reaction |  | 1.010 | 1.009 | 1.007 | 1.008 | 1.009 | 1.008 | 1.008 |
| Rate of semi-crystallization (140° C.) | sec | 4 | 5 | 10 | 17 | 29 | 3 | 3 |
| Carbon fiber |  | B-4 | B-4 | B-4 | B-4 | B-4 | B-10 | N-1 |
| Surface treatment agent for carbon fiber (Compound C) |  | DGEBA | DGEBA | DGEBA | DGEBA | DGEBA | DGEBA | — |
| Amount of Compound C | % by mass | 0.3 | 0.3 | 0.3 | 0.3 | 0.3 | 1.8 | 0 |
| Rate of Impregnation | % | 95 | 85 | 85 | 80 | 70 | 40 | 90 |

TABLE 3-continued

|  |  | Example | | | | | | Comparative Example |
|---|---|---|---|---|---|---|---|---|
|  |  | 18 | 19 | 20 | 21 | 22 | 23 | 11 |
| Interfacial shear strength | MPa | 60 | 58 | 52 | 41 | 33 | 72 | 7 |
| Flexural strength (Press molding for 3 min) | MPa | 2550 | 2470 | 2390 | 2030 | 1880 | 1680 | 1220 |

INDUSTRIAL APPLICABILITY

The fiber reinforced polyamide resin material of the present invention is highly rigid and less water-absorbing, highly moldable, and excellent in terms of mechanical characteristics of the molded article, so that the molded article using this resin material may be used for various parts or components. In particular, this is widely applicable to parts or enclosures of electric/electronic apparatuses, automobile interior parts, commodities such as furniture and so forth, proving its great value in industrial applicability.

The invention claimed is:

1. A fiber reinforced polyamide resin material, comprising 100 parts by mass of polyamide resin (A) which is a polycondensate of diamine and dicarboxylic acid and 5 to 300 parts by mass of a carbon fiber (B);
   wherein 70 mol % or more of the diamine is a xylylenediamine;
   50 mol % or more of the dicarboxylic acid is a straight-chain aliphatic dicarboxylic acid containing 4 to 20 carbon atoms;
   the polyamide resin (A) has a terminal amino group concentration ([$NH_2$]) (in μeq/g) of 70<[$NH_2$]<150 (in μeq/g);
   the polyamide resin (A) has a terminal carboxy group concentration ([COOH]) of 20<[COOH]<50 (in μeq/g);
   the polyamide resin (A) satisfies [$NH_2$]/[COOH]≥1.40; and
   the carbon fiber (B) has on a surface thereof a compound (C) which is reactive with an amino group and is treated in an amount of 1.4% by mass or less of the carbon fiber (B), the compound (C) comprising an epoxy compound having 1 to 4 of epoxy groups,
   wherein the polyamide resin has a rate of semi-crystallization of 17 seconds or less at 140° C., a rate of impregnation of the polyamide resin (A) in the carbon fiber (B) of 70% or more, and an interfacial shear strength between the polyamide resin (A) and the carbon fiber (B) of 33 MPa or more.

2. The fiber reinforced polyamide resin material of claim 1,
   wherein the xylylenediamine is meta-xylylenediamine, para-xylylenediamine or a mixture of meta-xylylenediamine and para-xylylenediamine.

3. The fiber reinforced polyamide resin material of claim 1,
   wherein the straight-chain aliphatic dicarboxylic acid is adipic acid, sebacic acid or a mixture of adipic acid and sebacic acid.

4. The fiber reinforced polyamide resin material of claim 1, wherein 50 mol % or more of a dicarboxylic acid constitutive unit is derived from sebacic acid.

5. The fiber reinforced polyamide resin material of claim 1,
   wherein 80 mol % or more of a diamine constitutive unit is derived from xylylenediamine and 30 mol % or more of a diamine constitutive unit is derived from para-xylylenediamine.

6. The fiber reinforced polyamide resin material of claim 1, wherein the reactive functional group is a carboxy group and an amino group.

7. The fiber reinforced polyamide resin material of claim 1,
   wherein the compound (C) which is reactive with an amino group further comprises at least one species selected from the group consisting of bisphenol A-glycidyl ether, bisphenol F-glycidyl ether and tolylene diisocyanate.

8. The fiber reinforced polyamide resin material of claim 1,
   wherein the compound (C) which is reactive with an amino group further comprises at least one species selected from the group consisting of a dicyanate adduct of bisphenol A and an alkylene oxide adduct diglycidyl ether of bisphenol F.

9. The fiber reinforced polyamide resin material of claim 1,
   wherein the polyamide resin (A) has a relative viscosity of 1.3 to 3.3.

10. The fiber reinforced polyamide resin material of claim 1, which satisfies a interfacial shear strength between the polyamide resin (A) and the carbon fiber (B), measured by the micro-droplet method, of 40 MPa or larger.

11. The fiber reinforced polyamide resin material of claim 1,
    wherein the polyamide resin (A) has a number-average molecular weight of 50,000 or smaller.

12. The fiber reinforced polyamide resin material of claim 1, having at least one bond formed between the compound (C) which is reactive with an amino group and amino group(s) contained in the polyamide resin (A).

13. A material obtained by kneading a fiber reinforced polyamide resin material described in claim 1.

14. A molded article obtained by molding a fiber reinforced polyamide resin material described in claim 1.

15. A method for manufacturing a molded article, the method comprising pressing a fiber reinforced polyamide resin material described in claim 1, for 1 to 60 minutes.

16. The fiber reinforced polyamide resin material described in claim 12, which is in a form of cloth or tape.

17. The fiber reinforced polyamide resin material of claim 1,
    wherein the polyamide resin (A) has a concentration of a reactive functional group of 40 μeq/g or more; and
    the compound (C) which is reactive with an amino group is treated in an amount of 1.4% by mass or less of the carbon fiber (B).

18. The fiber reinforced polyamide resin material of claim 1, wherein the polyamide resin has a rate of semi-crystallization of 17 seconds or less at 140° C.

19. The method for manufacturing a molded article of claim 15, wherein pressing a fiber reinforced polyamide resin material is carried out within 1 to 10 minutes.

20. The fiber reinforced polyamide resin material of claim 1, wherein the polyamide resin (A) has a terminal amino group concentration ($[NH_2]$) (in µeq/g) of $80<[NH_2]<150$ (in µeq/g).

21. The fiber reinforced polyamide resin material of claim 1, wherein the fiber reinforced polyamide resin material substantially does not include a polyamide resin other than polyamide resin (A).

22. The fiber reinforced polyamide resin material of claim 1, wherein the fiber reinforced polyamide resin material is free from a copper compound.

23. The fiber reinforced polyamide resin material of claim 1, wherein the carbon fiber (B) has an average fiber diameter of 1 to 10 µm.

* * * * *